United States Patent
Baek et al.

(10) Patent No.: US 9,191,184 B2
(45) Date of Patent: Nov. 17, 2015

(54) TRANSMITTER, RECEIVER AND SYSTEM INCLUDING THE SAME

(71) Applicants: SK Hynix Inc., Icheon (KR); Korea University Research and Business Foundation, Seoul (KR)

(72) Inventors: Young-Hyun Baek, Seoul (KR); Jun-Young Song, Seoul (KR); Chulwoo Kim, Seoul (KR); Hyun-Woo Lee, Icheon (KR)

(73) Assignees: SK HYNIX INC., Icheon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 14/281,767

(22) Filed: May 19, 2014

(65) Prior Publication Data

US 2015/0010122 A1 Jan. 8, 2015

(30) Foreign Application Priority Data

Jul. 5, 2013 (KR) ........................ 10-2013-0078664

(51) Int. Cl.
*H04L 7/00* (2006.01)
*H04L 7/033* (2006.01)

(52) U.S. Cl.
CPC ............ *H04L 7/0037* (2013.01); *H04L 7/0008* (2013.01); *H04L 7/033* (2013.01)

(58) Field of Classification Search
CPC ..... H04L 7/0037; H04L 7/033; H04L 7/0034; H04L 7/0029; H04L 25/0272; H04L 25/0292; H04L 25/028; H04L 25/08; H04L 7/0008; H03L 7/091
USPC .......... 375/355, 359, 360, 371, 373, 257, 326
See application file for complete search history.

(56) References Cited

U.S. PATENT DOCUMENTS

| | | | | |
|---|---|---|---|---|
| 3,988,729 A | * | 10/1976 | Herman | ........................... 341/68 |
| 5,963,606 A | * | 10/1999 | Drost et al. | ................... 375/371 |
| 6,205,182 B1 | * | 3/2001 | Pardini et al. | ................. 375/260 |
| 7,995,693 B2 | * | 8/2011 | Lee | ............................... 375/359 |

FOREIGN PATENT DOCUMENTS

| | | |
|---|---|---|
| EP | 1 112 648 B1 | 12/2004 |
| KR | 10-0306938 B1 | 9/2001 |

* cited by examiner

*Primary Examiner* — Phuong Phu

(57) ABSTRACT

A system includes a transmitter including: an aligner configured to align the phases of an input clock signal and data signal; and a transmission circuit configured to generate a transmission signal of which the phase and amplitude are controlled according to the aligned clock signal and the aligned data signal. The system may also include a receiver including: a clock extraction circuit configured to extract a temporary clock signal from the transmission signal; a data extraction circuit configured to extract a temporary data signal from the transmission signal; a clock delay selector configured to generate the clock signal by delaying the temporary clock signal according to a value of the temporary data signal; and a data recovery circuit configured to sample the temporary data signal according to the clock signal outputted from the clock delay selector and output a data signal.

25 Claims, 27 Drawing Sheets

TRANSMITTER, RECEIVER AND SYSTEM INCLUDING THE SAME

CROSS-REFERENCE TO RELATED APPLICATIONS

The present application claims priority of Korean Patent Application No. 10-2013-0078664, filed on Jul. 5, 2013, which is incorporated herein by reference in its entirety.

BACKGROUND

1. Field

Embodiments of the present disclosure relate to a transmitter, a receiver, and a system including the same, and more particularly, to a transmitter which transmits a clock signal and data through a transmission line to a receiver, and a system including the same.

2. Description of the Related Art

FIG. 1 illustrates clock signals and data signals being transmitted and received between a transmitter 10 and a receiver 20. The transmitter 10 and the receiver 20 transmit and receive clock signals and data signals through separate transmission lines.

In the illustrated transmission scheme, the number of transmission lines is increased with the increase in number of types of data to be transmitted. As a result, the area occupied by the transmission lines is increased, and power waste is also increased during the signal transmission.

Furthermore, a clock synchronization circuit, such as a phase locked loop (PLL), may be used in the receiver 20 to recover clock signals and data signals. However, the clock synchronization circuit occupies a large area, and consumes a large amount of power.

SUMMARY

Various embodiments are directed to a transmitter which transmits a clock signal and a data signal through one transmission line, a receiver which uses a circuit capable of reducing an area and power consumption in comparison to a conventional circuit when recovering a clock signal and a data signal from a transmitted signal, and a system including the same.

In an embodiment, a transmitter may include: an aligner configured to align the phases of an input clock signal and data signal and output the aligned clock signal and data signal; and a transmission signal generator configured to generate a transmission signal of which the phase and amplitude are controlled according to the aligned clock signal and data signal.

In an embodiment, a transmitter may include: an aligner configured to align the phases of a first clock signal, a second clock signal having the opposite phase to the first clock signal, a first data signal, and a second data signal, which are inputted thereto; a first transmission circuit configured to generate a first transmission signal of which the phase and amplitude are controlled according to the aligned first clock signal and first data signal; and a second transmission circuit configured to generate a second transmission signal of which the phase and amplitude are controlled according to the aligned second clock signal and second data signal.

In an embodiment, there is provided a receiver that receives a transmission signal of which the amplitude and phase are controlled according to a data signal and a clock signal. The receiver may include: a clock extraction circuit configured to extract a temporary clock signal from the transmission signal; a data extraction circuit configured to extract a temporary data signal from the transmission signal; a clock delay selector configured to select a delay amount of the temporary clock signal according to the value of the temporary data signal, and output the selected signal as the clock signal; and a data recovery circuit configured to sample the temporary data signal according to the clock signal outputted from the clock delay selector, and output a data signal.

In an embodiment, there is provided a receiver that receives a first transmission signal of which the amplitude and phase are controlled according to a first data signal and a first clock signal and a second transmission signal of which the amplitude and phase are controlled according to a second data signal and a second clock signal having the opposite signal to the first clock signal. The receiver may include: a first clock extraction circuit configured to separate a first temporary clock signal from the first transmission signal; a first data extraction circuit configured to separate a first temporary data signal from the first transmission signal; a first clock delay selector configured to control delay of the first temporary clock signal according to the first temporary data signal; a second clock extraction circuit configured to separate a second temporary clock signal from the second transmission signal; a second data extraction circuit configured to separate a second temporary data signal from the second transmission signal; a second clock delay selector configured to control delay of the second temporary clock signal according to the second temporary data signal; a clock aligner configured to align edges of signals outputted from the first and second clock delay selectors and output the first clock signal and the second clock signal; a first data recovery circuit configured to sample the first temporary data signal according to the first clock signal and recover the first data signal; and a second data recovery circuit configured to sample the second temporary data signal according to the second clock signal and recover the second data signal.

In an embodiment, a system may include: a transmitter including: an aligner configured to align the phases of an input clock signal and data signal; and a transmission circuit configured to generate a transmission signal of which the phase and amplitude are controlled according to the aligned clock signal and data signal; and a receiver including: a clock extraction circuit configured to extract a temporary clock signal from the transmission signal; a data extraction circuit configured to extract a temporary data signal from the transmission signal; a clock delay selector configured to select a delay amount of the temporary clock signal according to the value of the temporary data signal and output the selected signal as the clock signal; and a data recovery circuit configured to sample the temporary data signal according to the clock signal outputted from the clock delay selector and output a data signal.

In an embodiment, a system may include: a transmitter including: an aligner configured to align the phases of a first clock signal, a second clock signal having the opposite phase to the first clock signal, a first data signal, and a second data signal, which are inputted thereto; a first transmission circuit configured to generate a first transmission signal of which the phase and amplitude are controlled according to the aligned first clock signal and first data signal; and a second transmission circuit configured to generate a second transmission signal of which the phase and amplitude are controlled according to the aligned second clock signal and second data signal; and a receiver including: a first clock extraction circuit configured to separate a first temporary clock signal from the first transmission signal; a first data extraction circuit configured to separate a first temporary data signal from the first transmission signal; a first clock delay selector configured to control delay of the first temporary clock signal according to the first temporary data signal; a second clock extraction circuit configured to separate a second temporary clock signal from the second transmission signal; a second data extraction circuit configured to separate a second temporary data signal from the second transmission signal; a second clock delay selector configured to control delay of the second temporary clock signal according to the second temporary data signal; a clock aligner configured to align edges of signals outputted from the first and second clock delay selectors and output the first clock signal and the second clock signal; a first data recovery circuit configured to sample the first temporary data signal according to the first clock signal and recover the first data signal; and a second data recovery circuit configured to sample the second temporary data signal according to the second clock signal and recover the second data signal.

DETAILED DESCRIPTION

Figure 1:
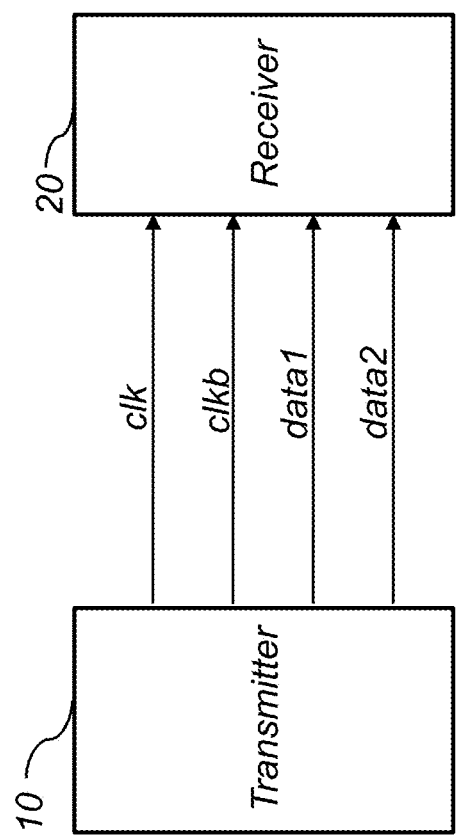
FIG. 1 is a block diagram illustrating a transmitter and a receiver of the related art.

Various embodiments will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will convey the scope of the present disclosure to those skilled in the art. Throughout the disclosure, like reference numerals refer to like parts throughout the various figures and embodiments.

Figure 2:
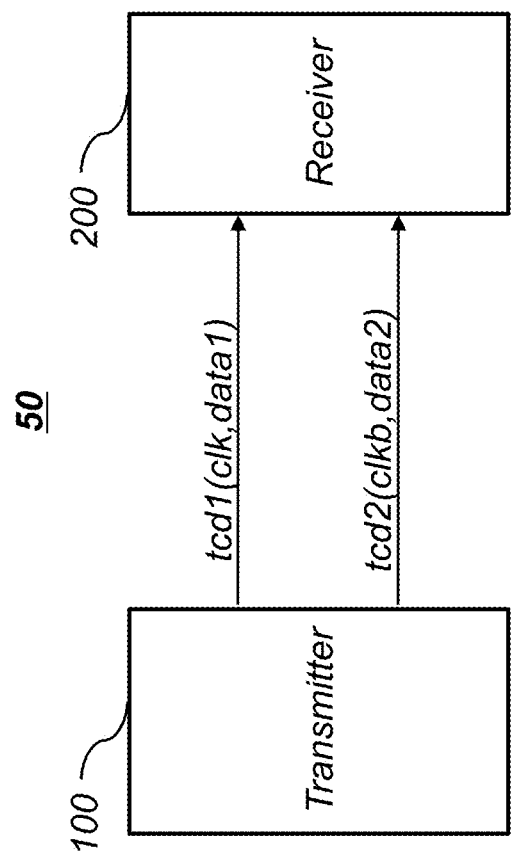
FIG. 2 is a block diagram of a system in accordance with an embodiment of the present disclosure.

FIG. 2 is a block diagram of a system 50 in accordance with an embodiment of the present disclosure. The system 50 includes a transmitter 100 and a receiver 200.

The transmitter 100 generates a first transmission signal tcd1 of which a phase and amplitude are controlled according to a first clock signal clk and a first data signal data1, and outputs the generated first transmission signal tcd1 to a first transmission line. The transmitter 100 also generates a second transmission signal tcd2 of which a phase and amplitude are controlled according to a second clock signal clkb having an opposite phase to the first clock signal clk and a second data signal data2, and outputs the generated second transmission signal tcd2 to a second transmission line.

The receiver 200 receives the first transmission signal tcd1 through the first transmission line and recovers the first clock signal clk and the first data signal data1. The receiver 200 also receives the second transmission signal tcd2 through the second transmission line and recovers the second clock signal clkb and the second data signal data2.

The detailed configurations and operations of the transmitter 100 and the receiver 200 will be described below.

Figure 3:
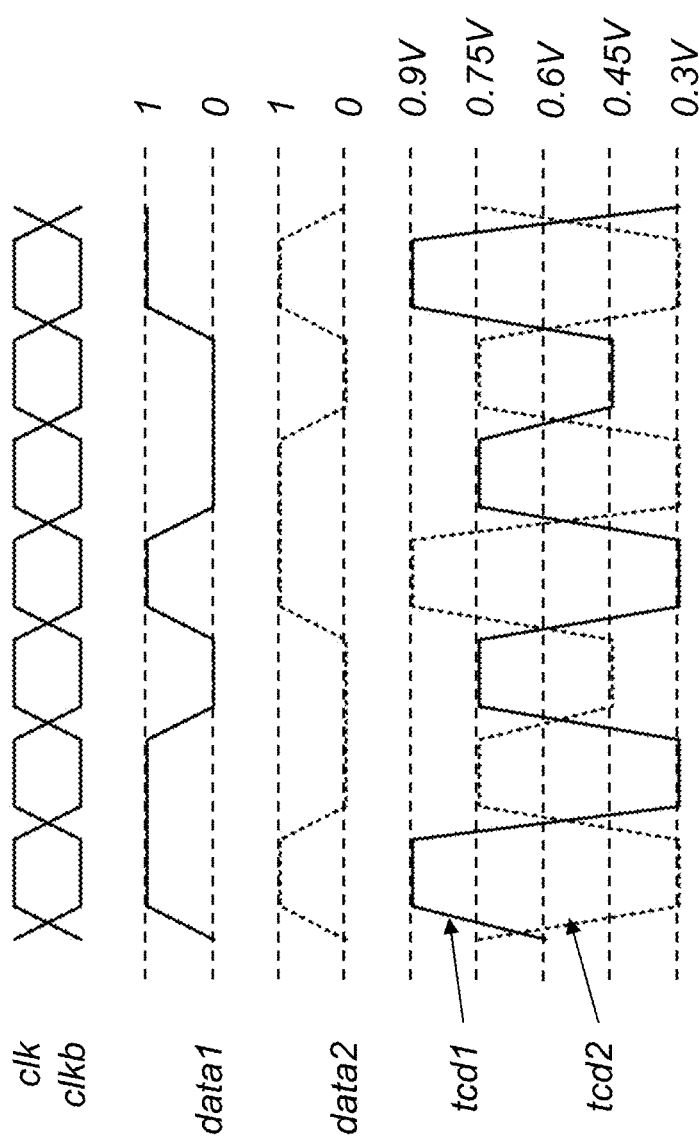
FIG. 3 is a waveform diagram of transmission signals used in the system of FIG. 2.

FIG. 3 is a waveform diagram of the transmission signals used in the system 50 in accordance with an embodiment.

The first transmission signal tcd1 has a phase and amplitude which are determined based on the first clock signal clk and the first data signal data1, and the second transmission signal tcd2 has a phase and amplitude which are determined based on the second clock signal clkb and the second data signal data2.

The phase of the first transmission signal tcd1 is determined based on the first clock signal clk, and the amplitude of the first transmission signal tcd1 is determined based on the first data signal data1. In an embodiment, wherein the amplitude of the first transmission signal tcd1 is an absolute magnitude relative to a center value, when the first data signal data1 has a value of 0, the amplitude of the first transmission signal tcd1 is set by a first level V1, and when the first data signal data1 has a value of 1, the amplitude of the first transmission signal tcd1 is set by a second level V2 larger than the first level V1.

Thus, in the embodiment illustrated by FIG. 3, the first level V1 is 0.15V, the second level V2 is 0.3V, and the center value is 0.6V. Accordingly, when the first data signal data1 has a value of 0, the first transmission signal tcd1 may have a value of 0.45V or 0.75V (that is, 0.6V±0.15V) according to the phase of the first clock signal clk; and when the first data signal data1 has a value of 1, the first transmission signal tcd1 may have a value of 0.3V or 0.9V (that is, 0.6V±0.3V) according to the phase of the first clock signal clk.

When the first data signal data1 is multi-bit data, amplitudes having a larger number of levels other than the first and second levels may be used. Hereafter, embodiments wherein both of the first data signal data1 and the second data signal data2 are single-bit data are described, but embodiments are not limited thereto.

Like the first transmission signal tcd1, the phase and amplitude of the second transmission signal tcd2 are determined based on the second clock signal clkb and the second data signal data2.

Hereafter, elements and operations of the transmitter 100 and the receiver 200 will be described in more detail.

Figure 4:
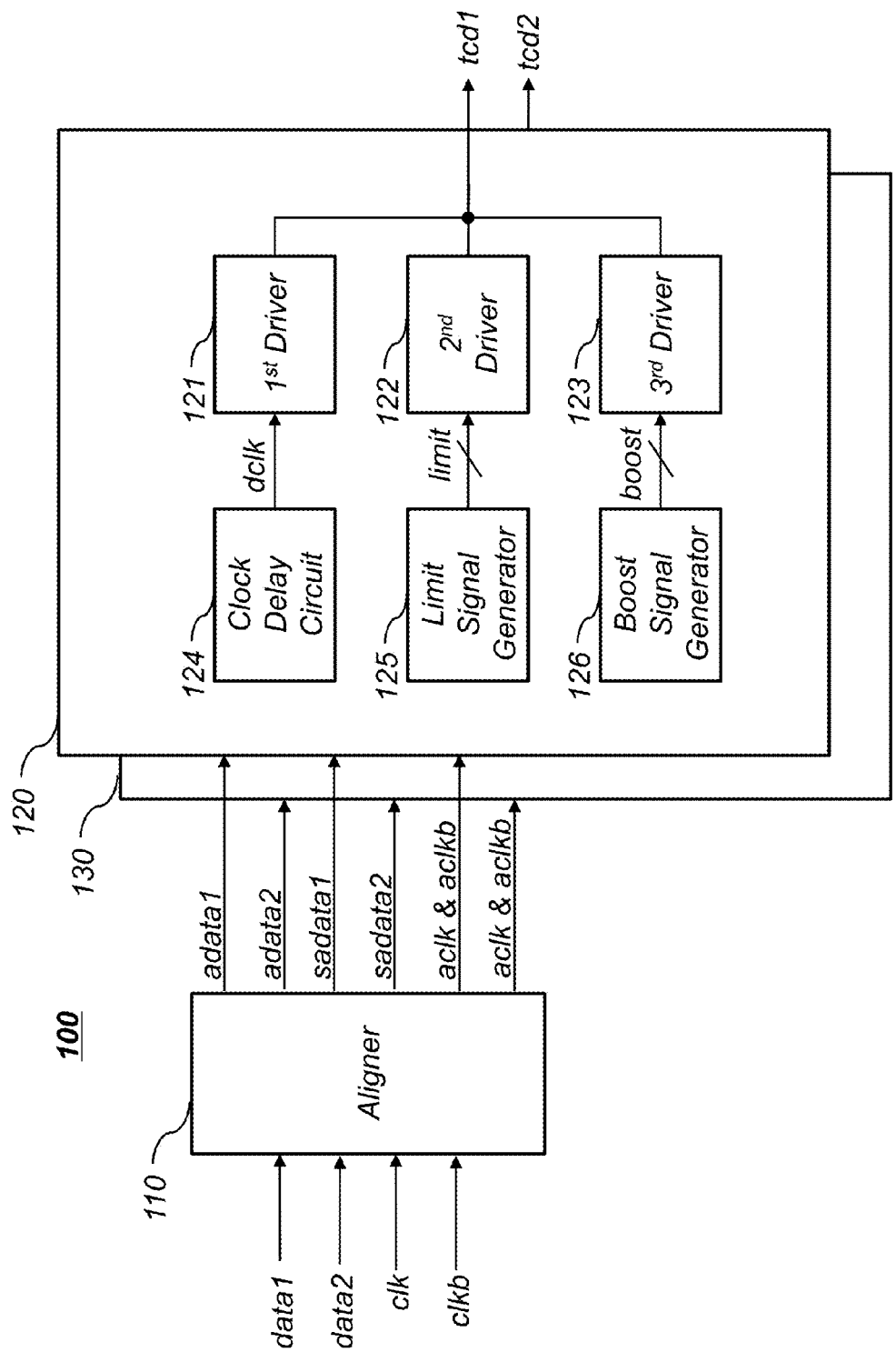
FIG. 4 is a block diagram illustrating a transmitter in accordance with an embodiment.

FIG. 4 illustrates a transmitter 100 suitable for use as the transmitter 100 of FIG. 2 according to an embodiment. The transmitter 100 includes an aligner 110, a first transmission circuit 120, and a second transmission circuit 130. The first transmission circuit 120 and the second transmission circuit 130 have substantially the same configuration.

Figure 5:
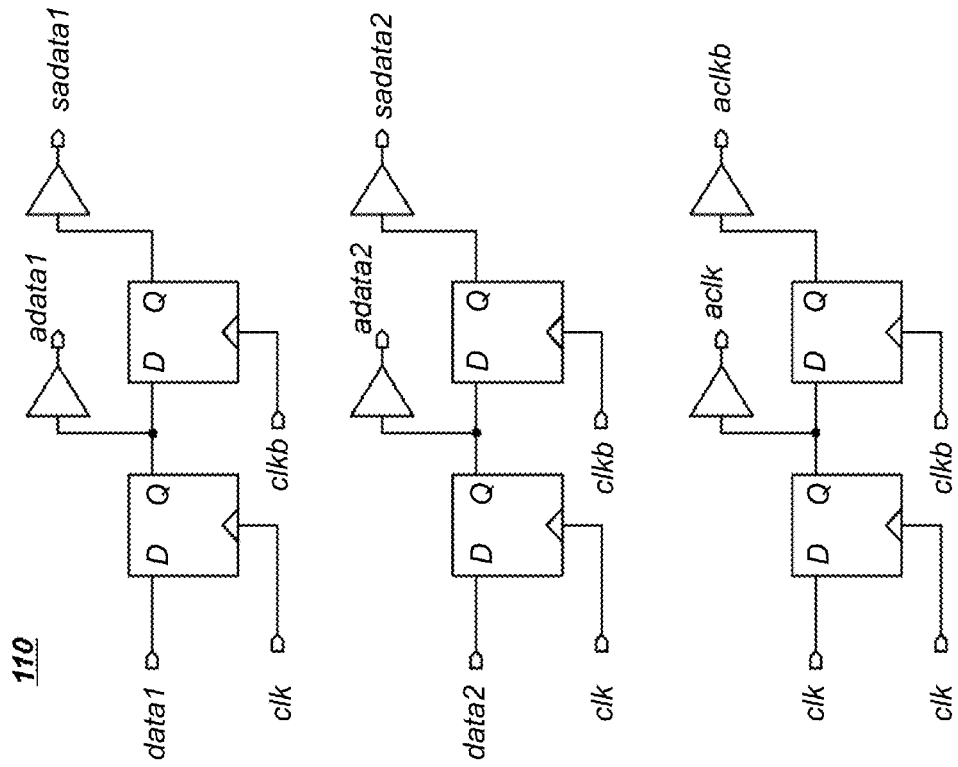
FIG. 5 is a circuit diagram illustrating an aligner in accordance with an embodiment.

FIG. 5 is a circuit diagram illustrating the aligner 110 according to an embodiment suitable for use in the transmitter 100 of FIG. 4. The aligner 110 includes a plurality of flip-flops to perform sampling. Each flip-flop illustrated in FIG. 5 includes a data input D, a data output Q, and a clock input indicated by a triangle. Each of the flip-flops samples the input data received at the data input D at both rising and falling edges of an input clock signal received at the clock input, and outputs the sampled data on the data output Q after a propagation delay.

The aligner 110 also includes a plurality of buffers. Although non-inverting buffers are illustrated in FIG. 5, embodiments are not limited thereto, and another embodiment could use inverting buffers.

The aligner 110 aligns the phases of the first and second data signals data1 and data2 with the phases of the first and second clock signals clk and clkb. For this operation, the aligner 110 samples the first data signal data1 and the second data signals data2 according to rising and falling edges of the first clock signal clk, and output a first aligned data signal adata1 and a second aligned data signal adata2.

Furthermore, the aligner 110 outputs a first aligned clock signal aclk and a second aligned clock signal aclkb, obtained by sampling the first clock signal clk and the second clock signal clkb with the first clock signal clk and the second clock signal clkb, in order to take into account a time delay occurring during the process of generating the first aligned data signal adata1 and the second aligned data signal adata2.

As illustrated in FIG. 5, the aligner 110 provides first and second shift signals sadata1 and sadata2, obtained by shifting the aligned signals adata1 and adata2 by ½ clock, with the first and second aligned data signals adata1 and adata2 and the first and second aligned clock signals aclk and aclkb. The first and second shift signals sadata1 and sadata2 are used to perform boosting as will be described below in detail.

Figure 6A:
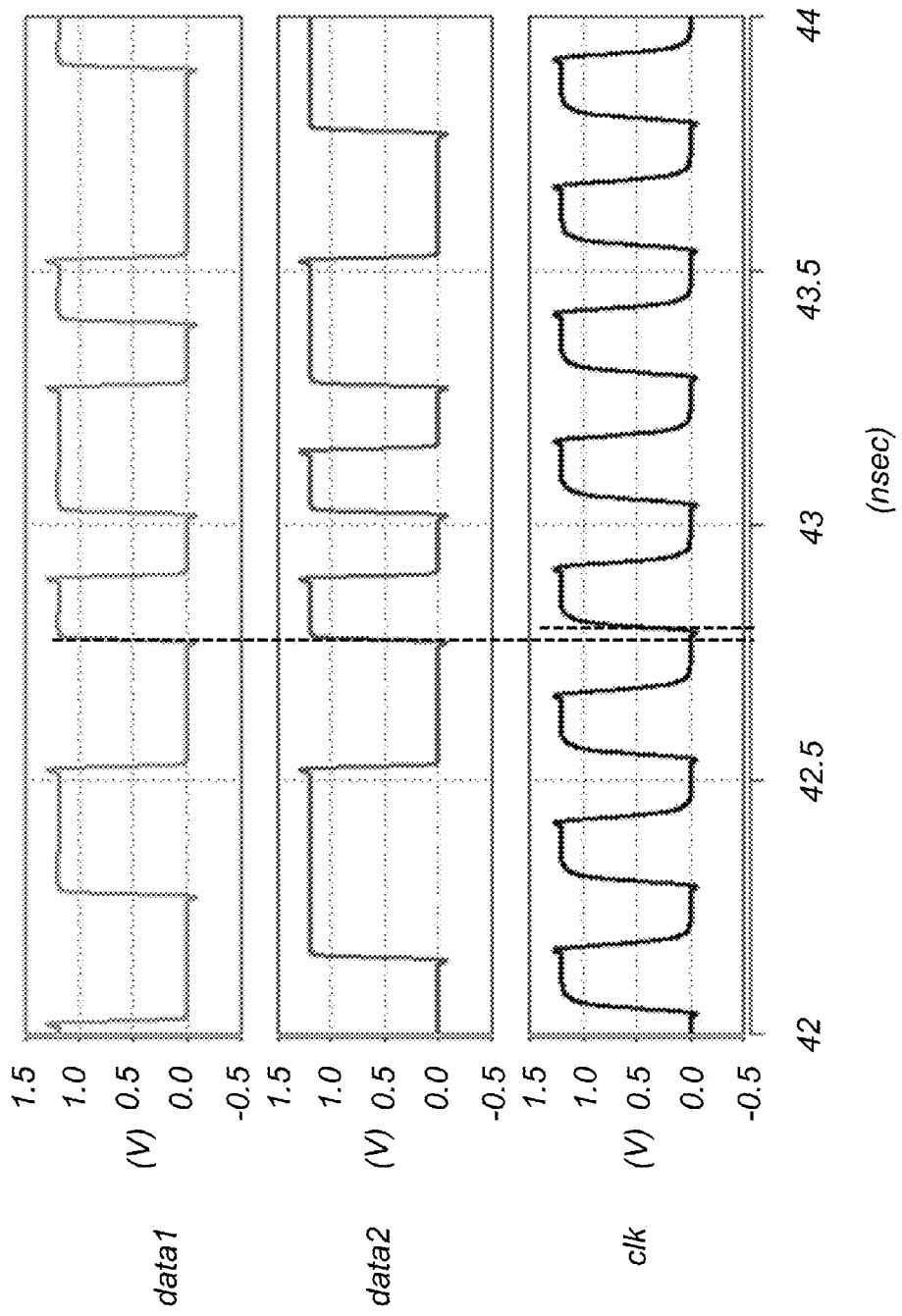
FIGS. 6A to 6C are waveform diagrams illustrating an operation of an aligner according to an embodiment.
Figure 6B:
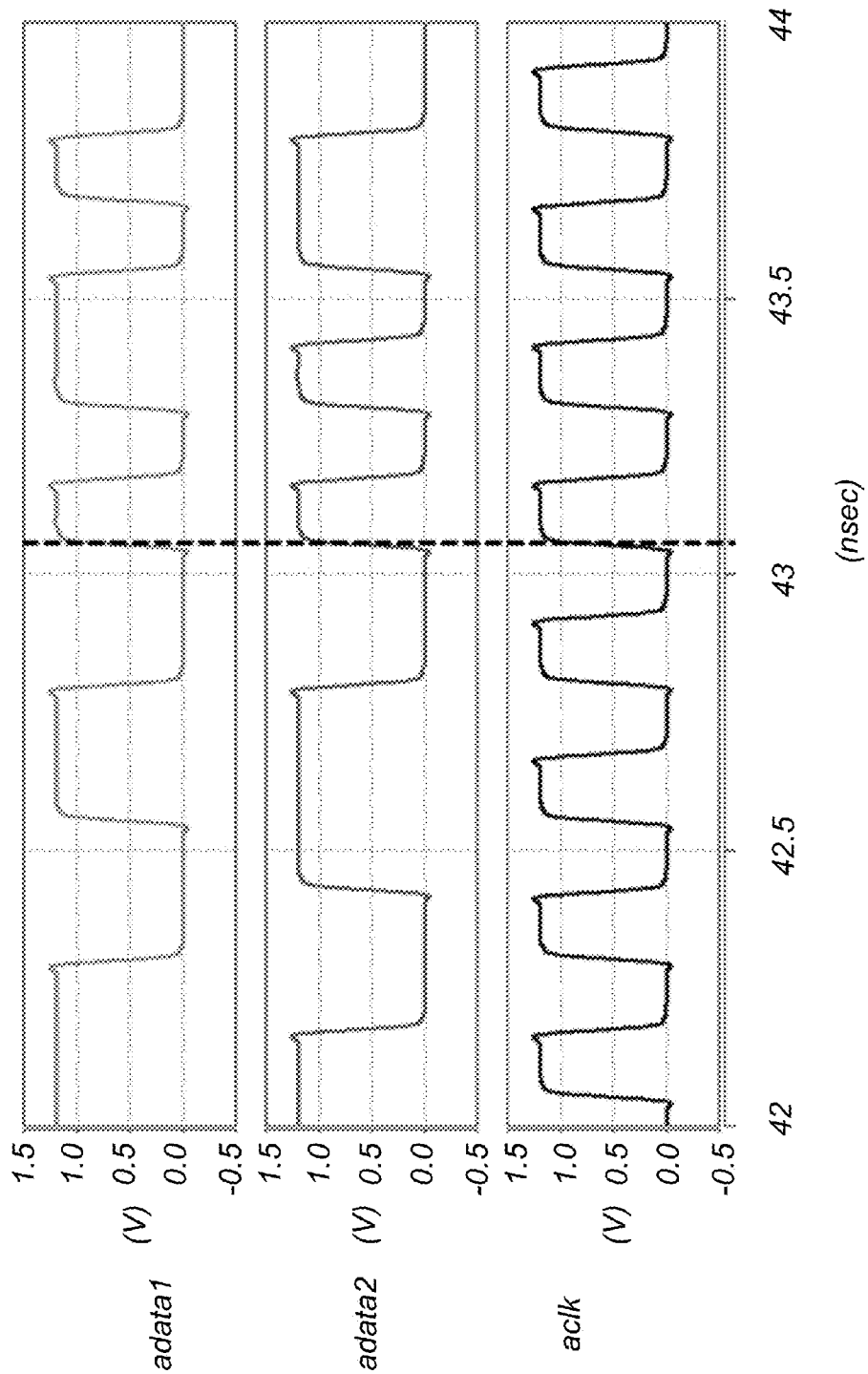
Figure 6C:
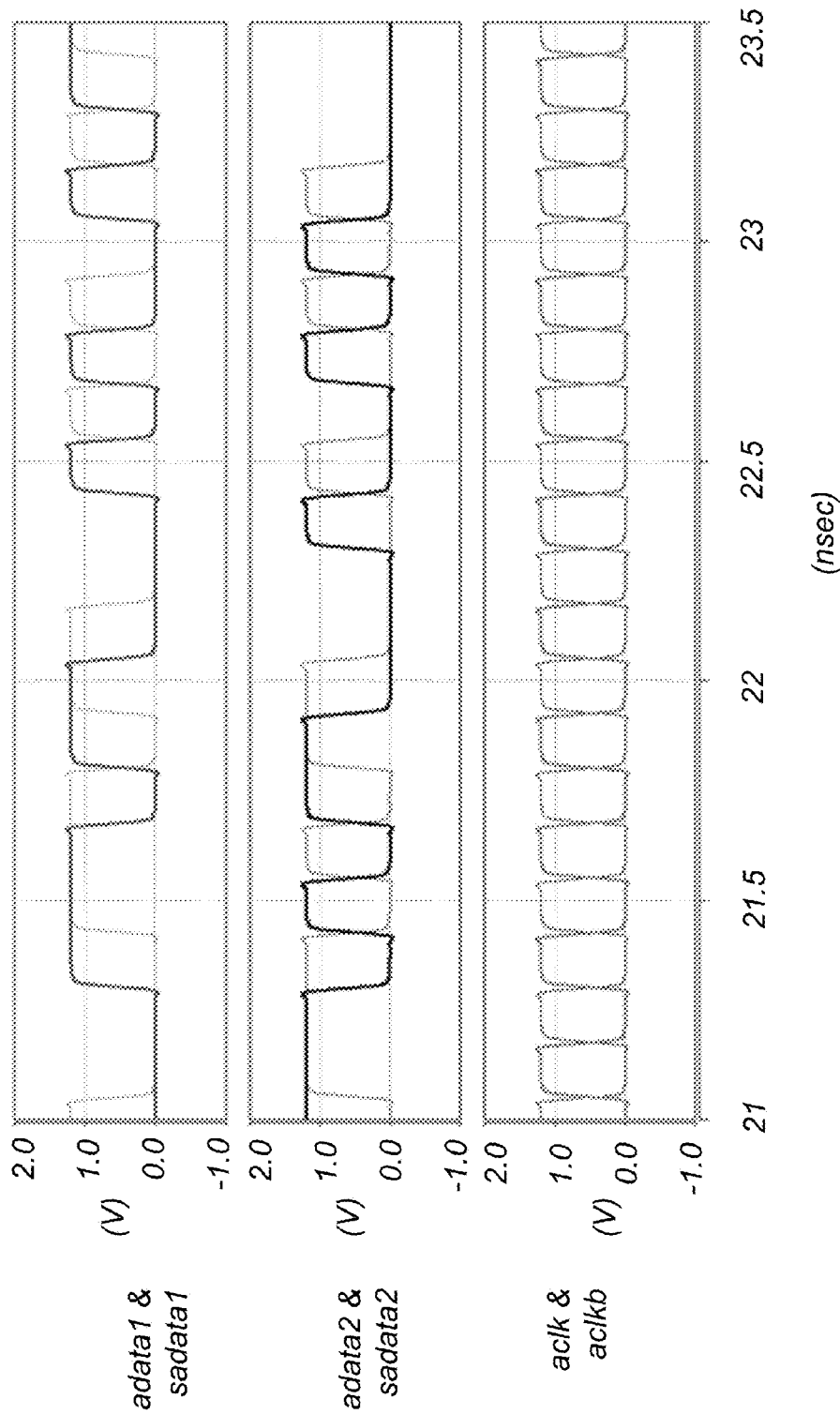

FIGS. 6A to 6C are simulation waveform diagrams illustrating the operation of the aligner 110. FIGS. 6A to 6C illustrate that data signals and clock signals are aligned and outputted.

Specifically, FIG. 6A shows inputs to the aligner 110 including the first data signal data1, the second data signal data2, and the first clock signal clk. As shown by the dashed vertical lines, transitions of the first and second data signals data1 and data2 are not aligned with the edges of the first clock signal clk.

FIG. 6B shows outputs of the aligner 110 including the first and second aligned data signals adata1 and adata2 and the first aligned clock signal aclk. As shown by the dashed vertical line, transitions of the first and second data signals data1 and data2 are aligned with the edges of the first aligned clock signal aclk.

FIG. 6C shows outputs of the aligner 110 and illustrates the relationship between the first and second aligned data signals adata1 and adata2 and the shift signals sadata1 and sadata2, which latter (shown in light gray) are produced by delaying the former, respectively, by one half-cycle of the first clock signal clk.

Referring again to FIG. 4, the other components of the transmitter 100 will be described. The first transmission circuit 120 and the second transmission circuit 130 have substantially the same configuration, and therefore the operation of the transmitter 100 will be described on the basis of the first transmission circuit 120.

The first transmission circuit 120 includes a first driver 121, a second driver 122, a third driver 123, a limit signal generator 125, and a boost signal generator 126. The first driver 121 drives the first transmission signal tcd1 according to the first aligned clock signal aclk. The second driver 122 controls the amplitude of the first transmission signal tcd1. The third driver 123 controls swing timing, including the rise times and fall times, of the first transmission signal tcd1. The limit signal generator 125 controls the second driver 122. The boost signal generator 126 controls the third driver 123.

The first transmission circuit 120 further includes a clock delay circuit 124 to output a first delayed clock signal dclk generated by delaying the first aligned clock signal aclk according to a time delay of the limit signal generator 125 and a time delay of the boost signal generator 126. When the clock delay circuit 124 is included, the first driver 121 drives the first transmission signal tcd1 according to the first delayed clock signal dclk received from the clock delay circuit 124.

As described with reference to FIG. 3, the phase and amplitude of the first transmission signal tcd1 are set according to the first clock signal clk and the first data signal data1. In the embodiment illustrated in FIG. 4, the phase and amplitude of the first transmission signal tcd1 are set according to the first delayed clock signal dclk corresponding to the first clock signal clk and the first aligned data signal adata1 corresponding to the first data signal data1.

Figure 7:
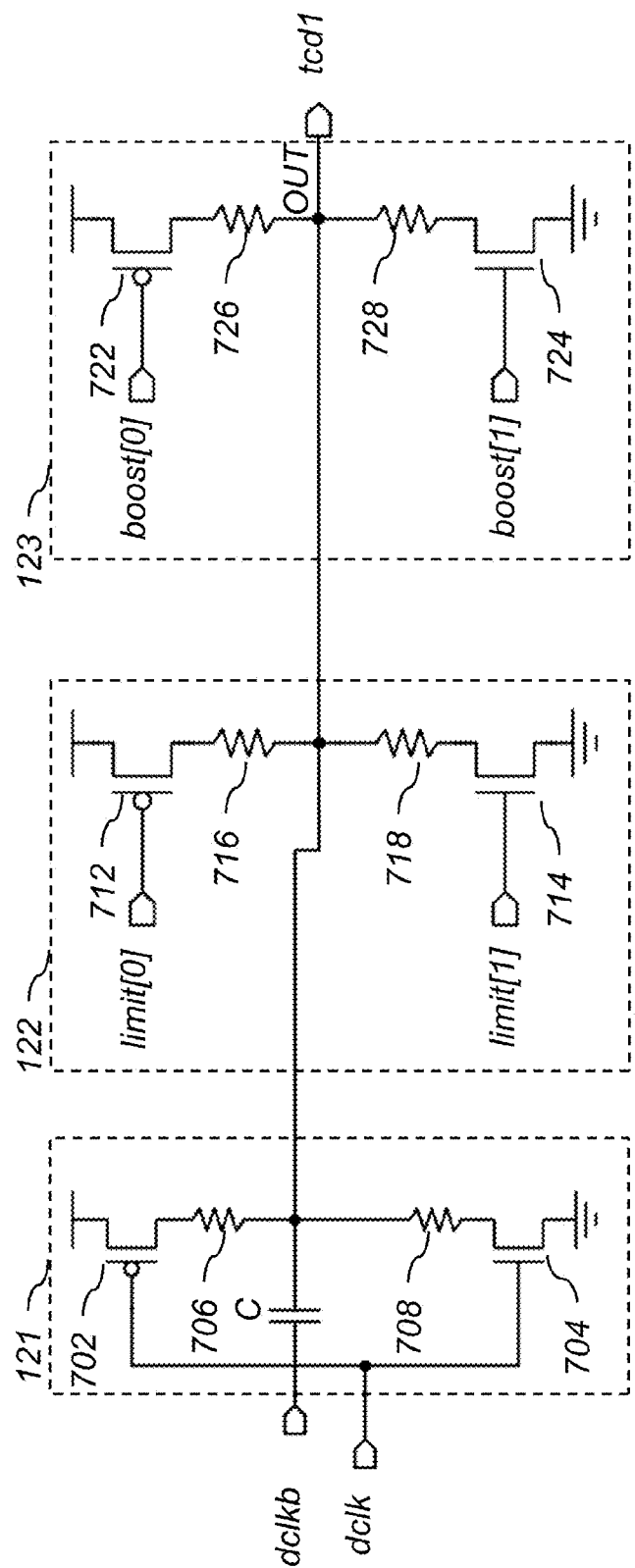
FIG. 7 is a circuit diagram illustrating a first driver, a second driver, and a third driver in accordance with an embodiment.

FIG. 7 is a circuit diagram illustrating embodiments of a first driver 121, a second driver 122, and a third driver 123 suitable for use in the first transmission circuit 120 of FIG. 4.

The first driver 121 drives the first transmission signal tcd1 such that the first transmission signal tcd1 has substantially the same phase as the first delayed clock signal dclk. The first driver 121 includes a first PMOS transistor 702 and a first resistor 706 connected in series between a power supply voltage node and an output node OUT associated with the first transmission signal tcd1. The first driver 121 further includes a second resistor 708 and a first NMOS transistor 704 connected in series between a ground voltage node and the output node OUT. In an embodiment, the first resistor 706 and the second resistor 708 include on resistance values of the first PMOS transistor 702 and the first NMOS transistor 704, respectively. The first delayed clock signal dclk is supplied to gates of the first PMOS transistor 702 and the first NMOS transistor 704.

In the embodiment of FIG. 7, the first driver 121 further includes a capacitor C having a first terminal coupled to the output node OUT associated with the first transmission signal tcd1 and a second terminal configured to receive a second delayed clock signal dclkb. The capacitor C may reduce jitter in the first transmission signal tcd1.

In the embodiment illustrated in FIG. 7, a power supply voltage is set to 1.2V, and the first transmission signal tcd1 oscillates around the center voltage of 0.6V as illustrated in FIG. 3. The first transmission signal tcd1 driven by the first driver 121 has substantially the same phase as the first delayed clock signal dclk, and swings between 0.3V and 0.9V around the center voltage of 0.6V. When transistors in the second and third drivers 122 and 123 are off, the center voltage and the swings of the first transmission signal tcd1 are substantially determined by the resistance values of the first resistor 706 and the second resistor 708, and a load resistance associated with the first transmission signal tcd1.

The second driver 122 controls the amplitude of the first transmission signal tcd1 according to control signals limit[0] and limit[1] generated by the limit signal generator 125. The second driver 122 includes a second PMOS transistor 712 and a third resistor 716 connected in series between a power supply voltage node and the output node OUT. A fourth resistor 718 and a second NMOS transistor 714 are connected in series between a ground voltage node and the output node OUT. In an embodiment, the third resistor 716 and the fourth resistor 718 include on resistance values of the second PMOS transistor 712 and the second NMOS transistor 714, respectively. The first and second limit signals limit[0] and limit[1] are supplied to gates of the second PMOS transistor 712 and the second NMOS transistor 714, respectively.

The limit signal generator 125 generates the first and second limit signals limit[0] and limit[1] such that the first transmission signal tcd1 has an amplitude, relative to the center voltage, of the first level (for example, 0.15V) or the second level (for example, 0.3V) according to the first aligned data signal adata1.

In an embodiment, the first and second limit signals limit[0] and limit[1] are controlled so that the second PMOS transistor 712 and the second NMOS transistor 714 are off when the first aligned data signal adata1 is 1. When the first aligned data signal adata1 is 0, the first limit signal limit[0] is controlled so that the second PMOS transistor 712 is on when the first delayed clock signal dclk is high, and the second limit signal limit[1] is controlled so that the second NMOS transistor 714 is on when the first delayed clock signal dclk is low. As a result, when the first aligned data signal adata1 is 0, the first resistor 706 and the fourth resistor 718 form a voltage divider when the first delayed clock signal dclk is low, and the second resistor 708 and the third resistor 716 form a voltage divider when the first delayed clock signal dclk is high.

The third driver 123 controls the swing timing of the first transmission signal tcd1 according to first and second boost signals boost[0] and boost[1] generated by the boost signal generator 126. The third driver 123 drives the first transmission signal tcd1 to advance the swing timing of the first transmission signal tcd1.

The third driver 123 includes a third PMOS transistor 722 and a fifth resistor 726 connected in series between a power supply voltage node and the output node OUT. A sixth resistor 728 and a third NMOS transistor 724 are connected in series between a ground voltage node and the output node OUT. In an embodiment, the fifth resistor 726 and the sixth resistor 728 include on resistance values of the third PMOS transistor 722 and the third NMOS transistor 724, respectively. The first and second boost signals boost[0] and boost[1] are supplied to gates of the third PMOS transistor 722 and the third NMOS transistor 724, respectively.

Comparing a case in which the first transmission signal tcd1 swings to the opposite phase and has an amplitude of the second level V2 to a case in which the first transmission signal tcd1 swings to the opposite phase and has an amplitude of the first level V1, the swing in the former case is larger than the swing in the latter case. Thus, in the absence of third driver 123, the swing timing, that is, the time until the first transmission signal tcd1 reaches the desired level, is relatively delayed in the former case. As a result the quality of the first transmission signal tcd1, in terms of jitter and duty cycle ratio, may be degraded.

To prevent this degradation, when the first transmission signal tcd1 has a large amplitude swing, the third driver 123 operates at the start of the large amplitude swing to advance the swing timing of the first transmission signal tcd1.

Figure 8:
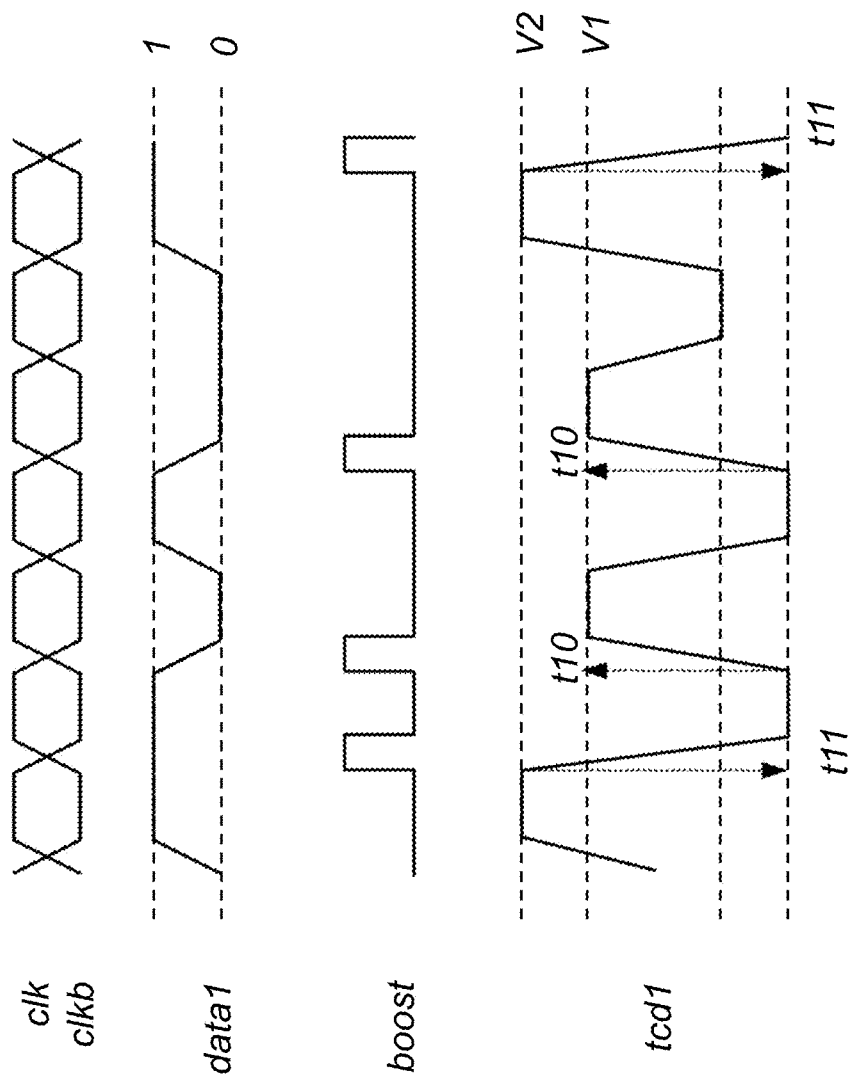
FIG. 8 is a waveform diagram illustrating timings of boost signals according to an embodiment.

FIG. 8 is a waveform diagram illustrating the timings at which a boosting operation is performed when the first transmission signal tcd1 starts to swing in a state where the first transmission signal tcd1 has a relatively large amplitude. FIG. 8 shows a conceptual boost active signal boost which is high when the third driver 123 is active. That is, the conceptual boost active signal boost is high when the first boost signal boost[0] has a low value or when the second boost signal boost[1] has a high value, and is low otherwise.

As shown in FIG. 8, at the times indicated by t11 and t10, when the value of the first data signal data1 was 1 just prior to a transition of the first clock signal clk, the first transmission signal tcd1 will have a large amplitude swing, and the boost active signal boost is high at the start of the swing in order to advance the timing of the swing. When the value of the first data signal data1 was 0 just prior to a transition of the first clock signal clk, the boost active signal boost remains low and no advancing of the swing occurs.

Although FIG. 8 shows the boost active signal boost being high according to prior values of the first data signal data1, embodiments are not limited thereto. In an embodiment, the generation of the boost active signal boost is performed according to characteristics of the first through third drivers 121 through 123 of FIG. 4.

Figure 9:
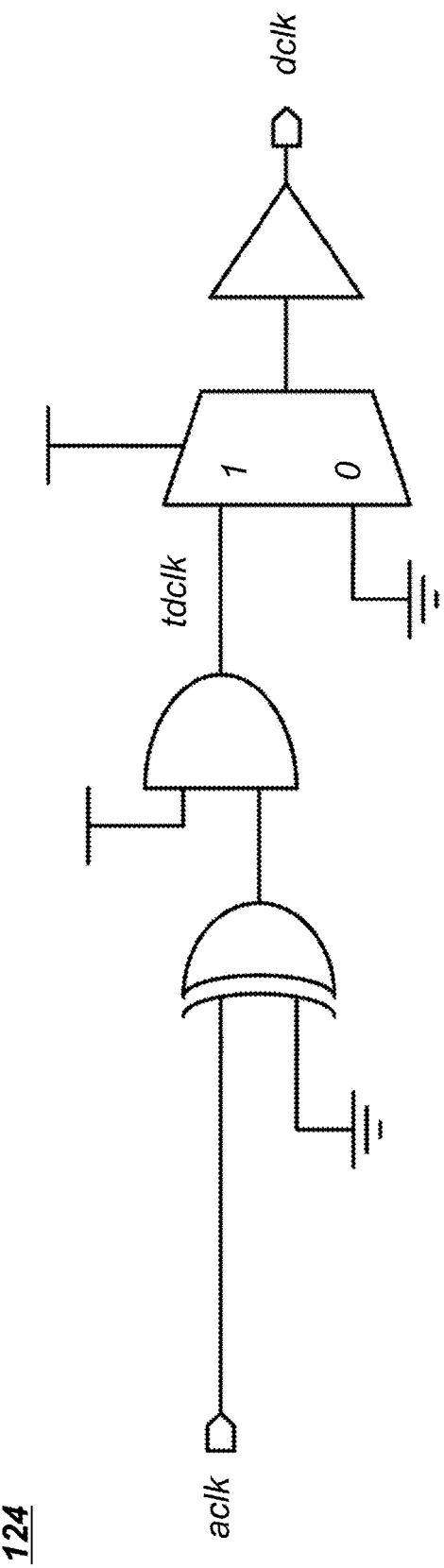
FIG. 9 is a circuit diagram of a clock delay circuit in accordance with an embodiment.

FIG. 9 is a circuit diagram of a clock delay circuit 124 according to an embodiment suitable for use in the first transmission circuit 120 of FIG. 4. The clock delay circuit 124 replicates a time delay which occurs in the limit signal generator 125 and/or the boost signal generator 126, and provides the first delayed clock signal dclk by delaying the first aligned clock signal aclk to the first driver 121.

In order to replicate the time delay, the clock delay circuit 124 has substantially the same configuration as the limit signal generator 125 and the boost signal generator 126.

In addition to generating the first delayed clock signal dclk, the clock delay circuit 124 also generates a first temporary delayed clock signal tdclk for use in the limit signal generator 125 and the boost signal generator 126. The first temporary delayed clock signal tdclk reflects a delay corresponding to two logical gates, e.g., an exclusive-OR gate and an AND gate shown in FIG. 9.

In an embodiment in which the time delay in the limit signal generator 125 and the boost signal generator 126 is ignorable as compared to the clock frequency, the first transmission circuit 120 may not include the clock delay circuit 124, and thus the first delayed clock signal dclk may have substantially the same phase as the first aligned clock signal aclk.

Figure 10:
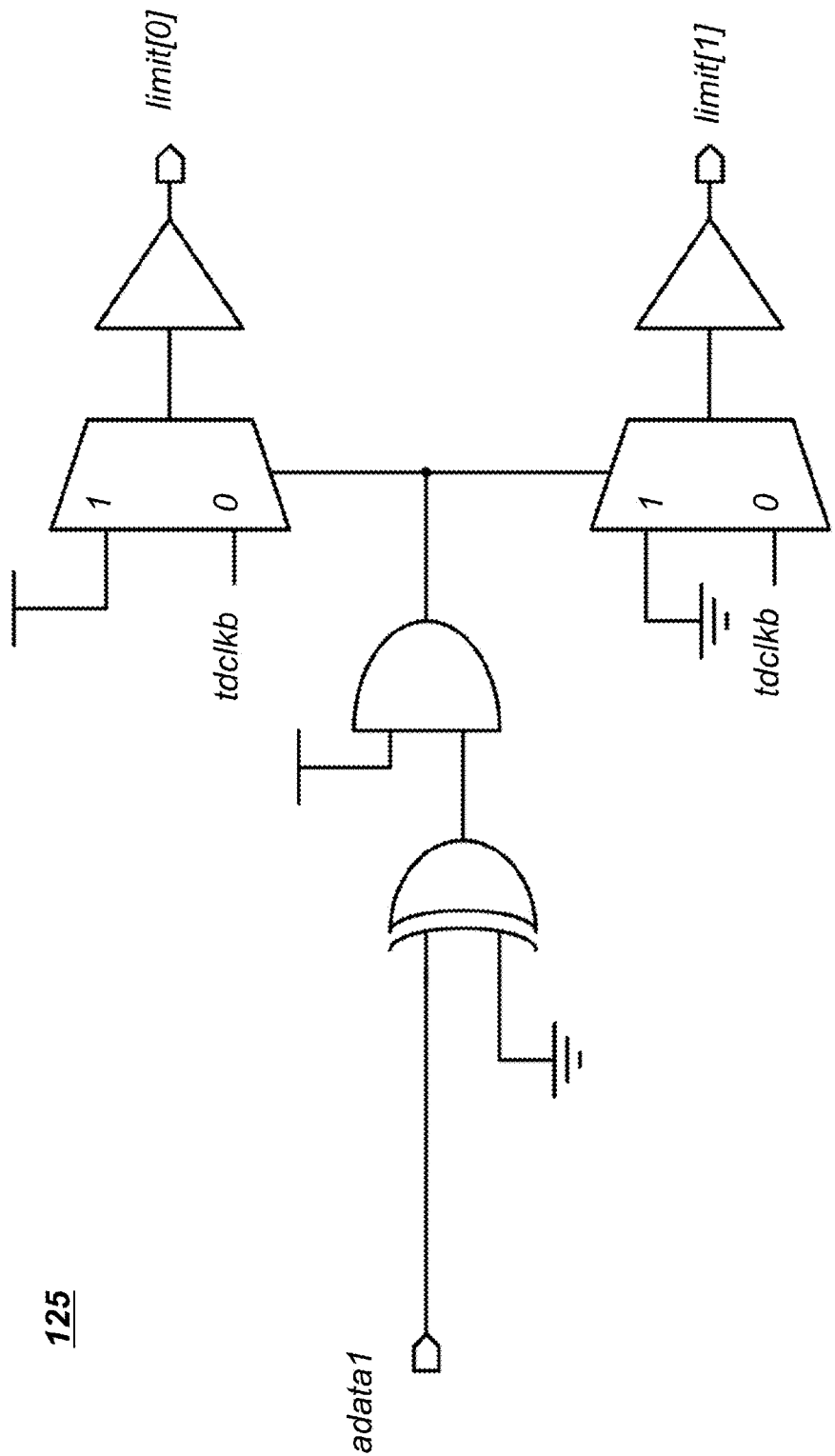
FIG. 10 is a circuit diagram of a limit signal generator in accordance with an embodiment.

FIG. 10 is a circuit diagram of a limit signal generator 125 according to an embodiment suitable for use in the first transmission circuit 120 of FIG. 4.

In the limit signal generator 125 of FIG. 10, when the first aligned data signal adata1 is 1, the first limit signal limit[0] becomes a high level, and the second limit signal limit[1] becomes a low level. As a result, all transistors of the second driver 122 are turned off, and the first transmission signal tcd1 is equal to the output of the first driver 121.

When the first aligned data signal adata1 is 0, a second temporary delayed clock signal tdclkb is outputted to the first and second limit signals limit[0] and limit[1]. The second temporary delayed clock signal tdclkb is a signal obtained by delaying the second aligned clock signal aclkb by a delay time corresponding to two logical gates (not shown) like the first temporary delayed clock signal tdclk shown in FIG. 9. When the delay time is ignorable, the second temporary delayed clock signal tdclkb has substantially the same phase as the second aligned clock signal aclkb.

Accordingly, when the first aligned data signal adata1 is 0, only one of the second PMOS transistor 712 and the second NMOS transistor 714 of the second driver 122 illustrated in FIG. 7 is turned on at a specific time, according to the phase of the second temporary delayed clock signal tdclkb. Thus, a ratio of a resistance value between the output terminal OUT and the power supply voltage terminal of the first driver 121 to a resistance value between the output terminal OUT and the ground voltage terminal is changed when the first driver 121 drives a high value to the output terminal OUT, and a ratio of a resistance value between the output terminal OUT and the ground voltage terminal of the first driver 121 to a resistance value between the output terminal OUT and the power supply voltage terminal is changed when the first driver 121 drives a low value to the output terminal OUT. Through such an operation, the amplitude of the first transmission signal tcd1 decreases to the first level V1.

Figure 11:
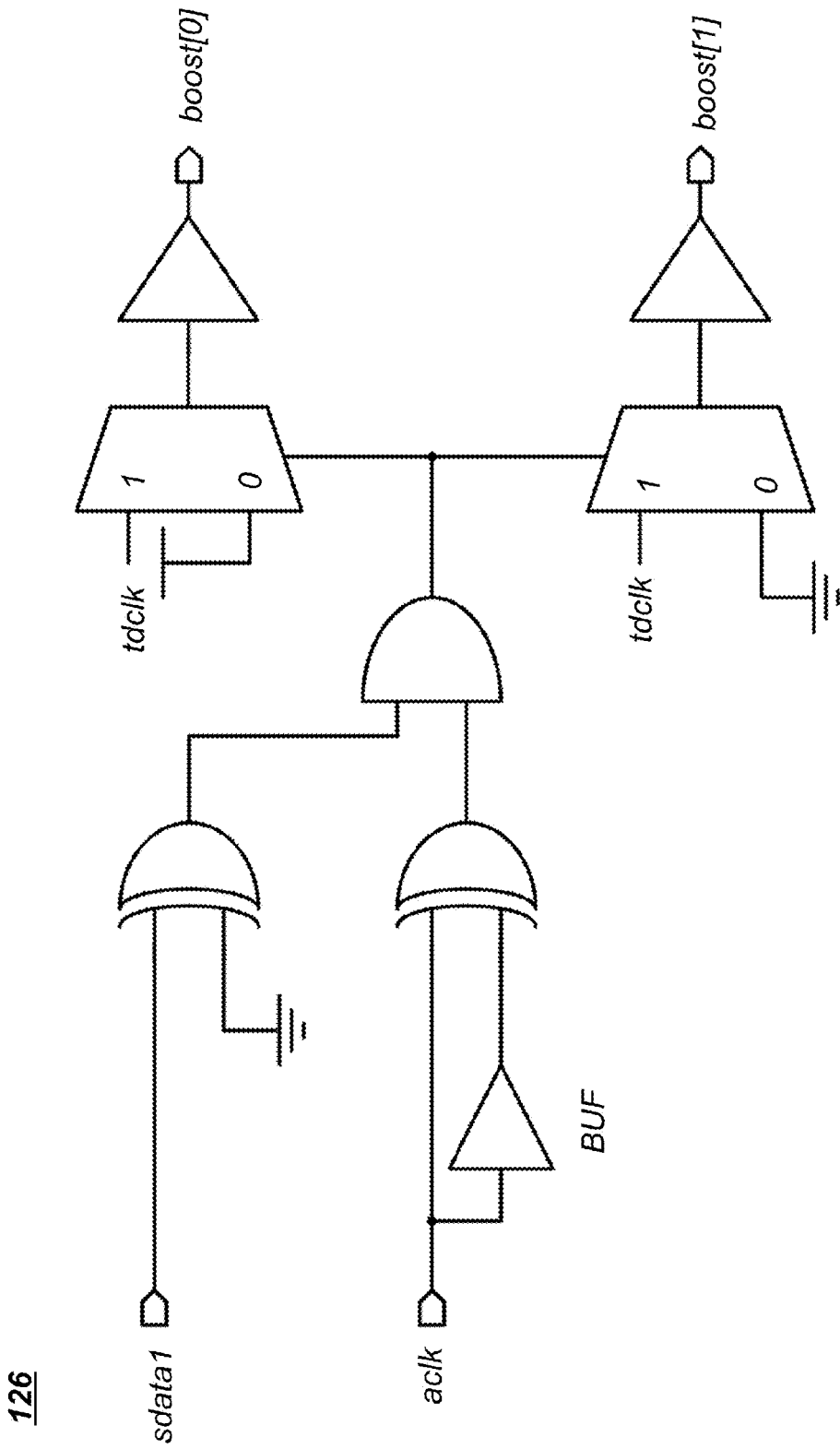
FIG. 11 is a circuit diagram of a boost signal generator in accordance with an embodiment.

FIG. 11 is a circuit diagram illustrating a boost signal generator 126 according to an embodiment suitable for use in the first transmission circuit 120 of FIG. 4. When the shifted first aligned data signal sadata1 is 0, the levels of the first and second boost signals boost[0] and boost[1] are 1 and 0, respectively, and the third PMOS transistor 722 and the third NMOS transistor 724 of the third driver 123 are turned off. When the shifted first aligned data signal sadata1 is 1, the levels of the first and second boost signals boost[0] and boost[1] have the same level as the clock signal tdclk during a pulse interval at an edge of the clock signal tdclk.

That is, when the shifted first aligned data signal sadata1 is 1, at a rising edge of the clock signal tdclk, the first and second boost signals boost[0] and boost[1] have a level of 1 during a first pulse interval, and as a result the third NMOS transistor 724 of the third driver 123 of FIG. 7 is turned on for the first pulse interval. At a falling edge of the clock signal tdclk, the first and second boost signals boost[0] and boost[1] have a level of 0 during a second pulse interval, and as a result the third PMOS transistor 722 of the third driver 123 of FIG. 7 is turned on for the second pulse interval.

The length of the first and second pulse intervals is determined according to a delay time of a buffer BUF shown in FIG. 11. The turned-on transistors thus act to assist the swing of the first transmission signal tcd1.

The configuration of the first transmission circuit 120 has been described. The second transmission circuit 130 outputs a second transmission signal tcd2, and the configuration and operating principle of the second transmission circuit 130 are substantially the same as those of the first transmission circuit 120. Thus, the detailed descriptions thereof are omitted herein.

Figure 12:
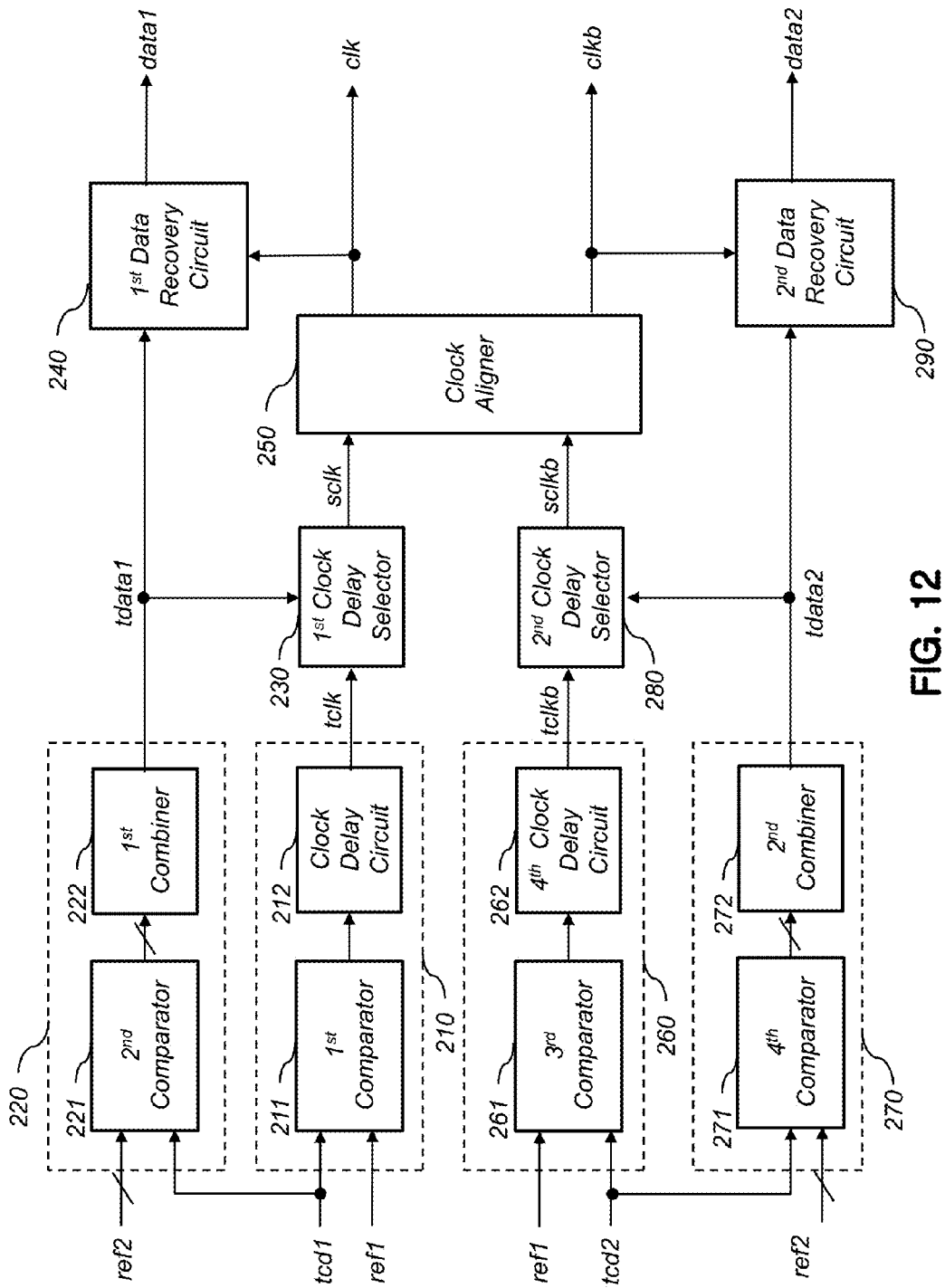
FIG. 12 is a block diagram illustrating a receiver in accordance with an embodiment.

FIG. 12 is a block diagram illustrating a receiver 200 according to an embodiment suitable for use in the system 50 of FIG. 2. The receiver 200 includes a first clock extraction circuit 210, a first data extraction circuit 220, a first clock delay selector 230, a first data recovery circuit 240, a second clock extraction circuit 260, a second data extraction circuit 270, a second clock delay selector 280, a second data recovery circuit 290, and a clock aligner 250.

The first clock extraction circuit 210 receives the first transmission signal tcd1, and outputs a first temporary clock signal tclk based on the first transmission signal tcd1. The first clock extraction circuit 210 includes a first comparator 211 to compare the first transmission signal tcd1 to a first reference voltage ref1. Furthermore, as described above, the first clock extraction circuit 210 may further include a clock delay circuit 212 to delay an output signal of the first comparator 211 to account for a delay time in the first data extraction circuit 220.

Figure 13:
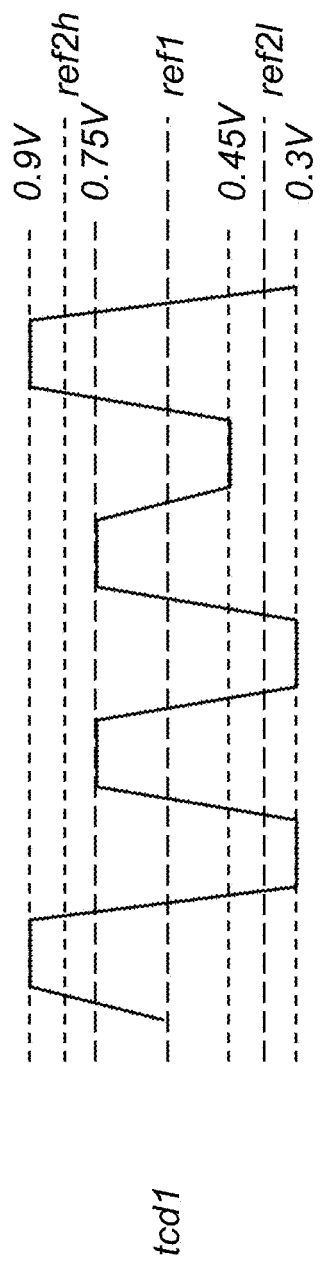
FIG. 13 is a waveform diagram illustrating a relation between a first transmission signal and reference voltages.

FIG. 13 is a waveform diagram illustrating the first transmission signal tcd1 that is compared to the first reference voltage ref1 and high and low second reference voltages ref2h and ref2l.

Figure 14:
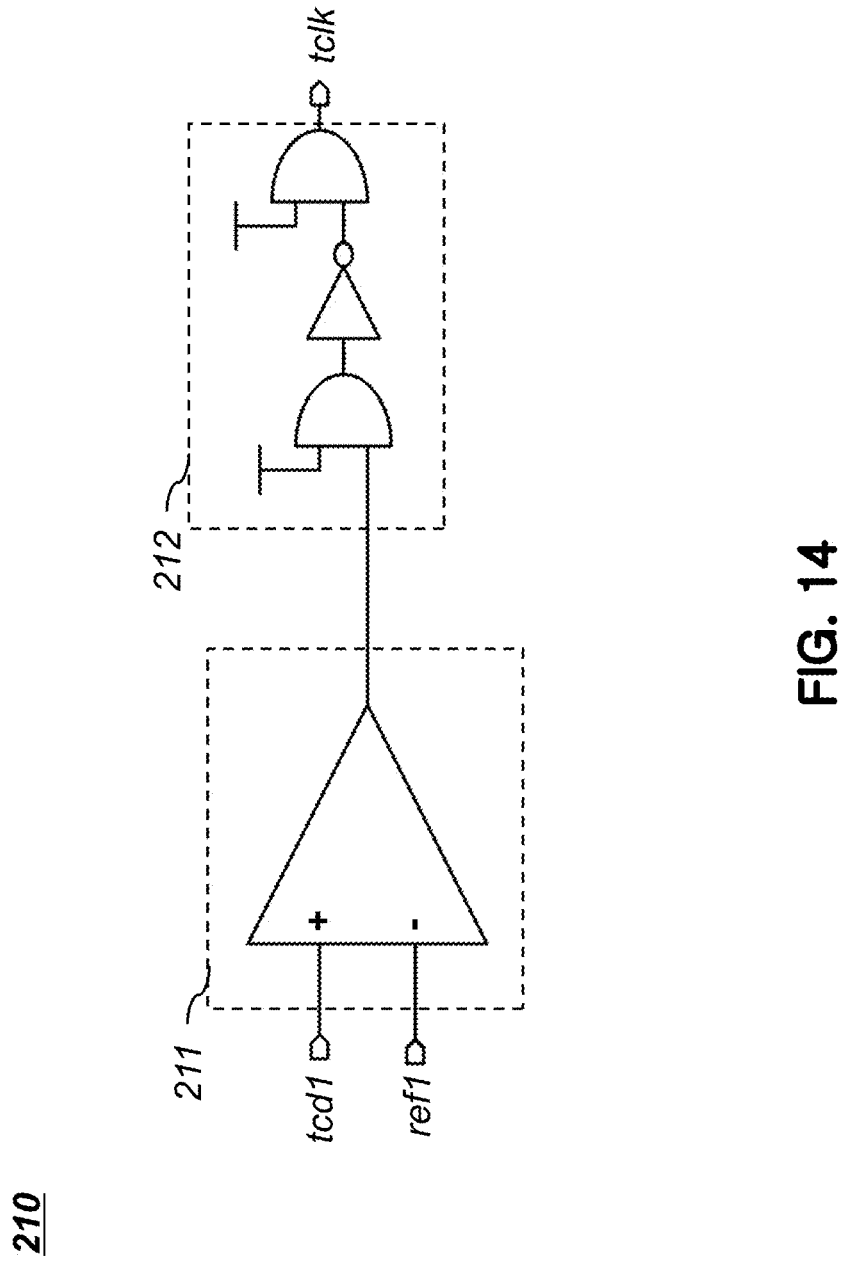
FIG. 14 is a circuit diagram of a first clock extraction circuit in accordance with an embodiment.

FIG. 14 is a circuit diagram illustrating the first clock extraction circuit 210 of FIG. 12 according to an embodiment. The first clock extraction circuit 210 includes a first comparator 211 and a clock delay circuit 212.

The first comparator 211 compares the first transmission signal tcd1 to the first reference voltage ref1 and generates an output signal. Because the first reference voltage ref1 has a level corresponding to the center value of the amplitude of the first transmission signal tcd1, the output signal of the first comparator 211 has substantially the same phase as the first transmission signal tcd1 and corresponds to a clock signal.

The clock delay circuit 212 delays the output signal of the first comparator 211 and outputs a first temporary clock signal tclk. The delay amount of the clock delay circuit 212 is set in such a manner that the total delay amount of the first clock extraction circuit 210 is substantially equal to the total delay amount of the first data extraction circuit 220, each total delay amount being measured from the input receiving the first transmission signal tcd1 to the output of each respective circuit.

Figure 15:
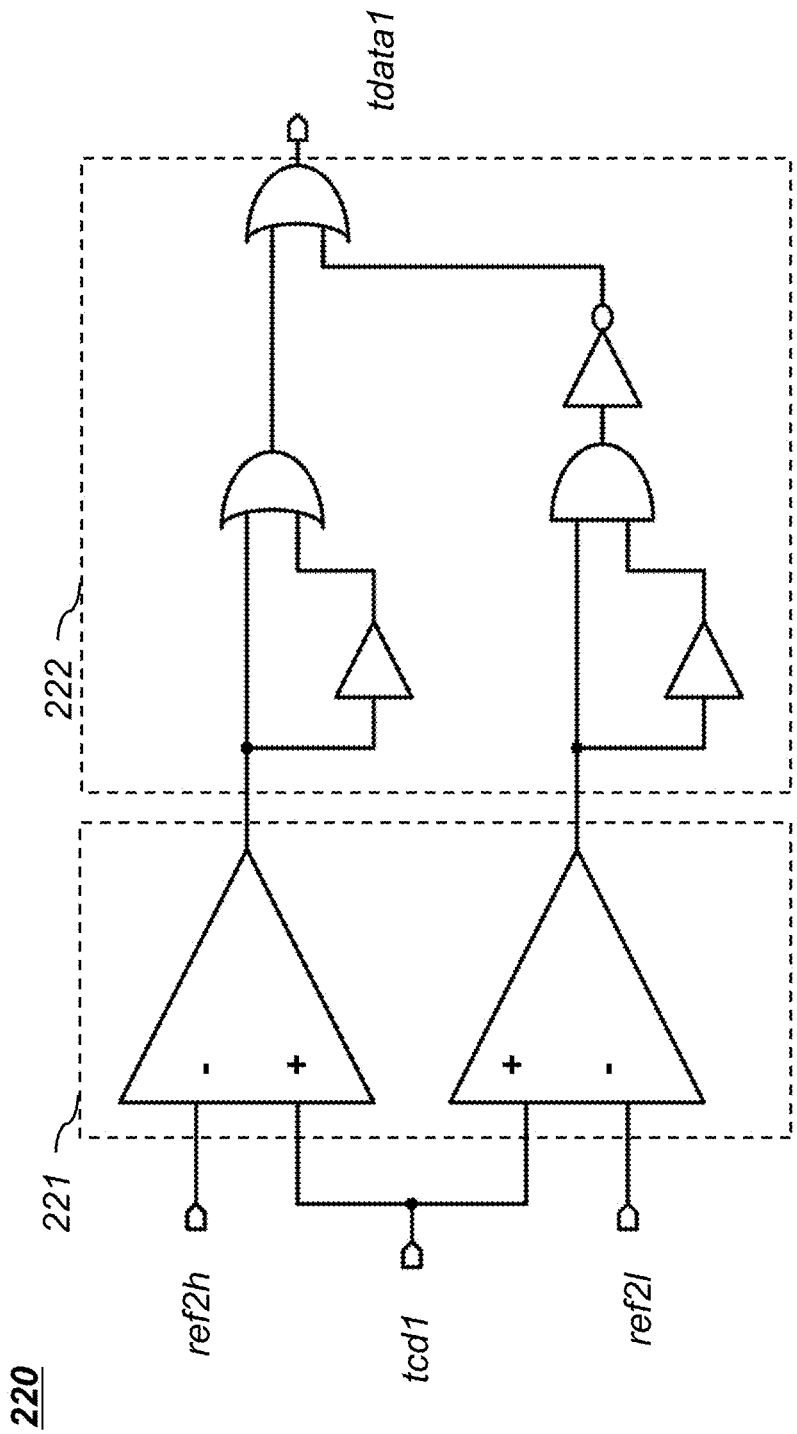
FIG. 15 is a circuit diagram of a first data extraction circuit in accordance with an embodiment.

FIG. 15 is a circuit diagram illustrating the first data extraction circuit 220 of FIG. 12 according to an embodiment. The first data extraction circuit 220 receives the first transmission signal tcd1 and outputs a first temporary data signal tdata1 based on the first transmission signal tcd1. The first data extraction circuit 220 includes a second comparator 221 and a first combiner 222. The second comparator 221 compares the first transmission signal tcd1 to the high and low second reference voltages ref2h and ref2l, and the first combiner 222 combines output signals of the second comparator 221.

As illustrated in FIG. 13, a voltage between 0.75V and 0.9V and a voltage between 0.3V and 0.45V may be selected as the high and low second reference voltages ref2h and ref2l, respectively, used in the second comparator 221. The second comparator 221 may compare the first transmission signal tcd1 to the high and low second reference voltages ref2h and ref2l, and output two comparison results.

The first combiner 222 combines the two comparison results outputted from the second combiner 221 and generates the first temporary data signal tdata1. When the first transmission signal tcd1 is larger or smaller than both of the second reference voltages ref2h and ref2l, the temporary data corresponds to data '1'. When the first transmission signal tcd1 is smaller than the high second reference voltages ref2h and larger than the low second reference voltage ref2l, the first temporary data tdata1 corresponds to data '0'.

In FIG. 15, since the first combiner 222 generates the first temporary data signal tdata1 through three logical gates, a delay may occur and correspond to the delay time through the three logical gates.

As described above, the first clock extraction circuit 210 further includes the clock delay circuit 212, in order to account for the delay time. As illustrated in FIG. 14, the clock delay circuit 212 is designed to replicate the delay of three logical gates.

As illustrated in FIG. 13, the amplitude of the first transmission signal tcd1 is not uniform, but changes depending on data. Thus, the first temporary clock signal tclk outputted from the first clock extraction circuit 210 may include jitter caused by data.

Figure 19A:
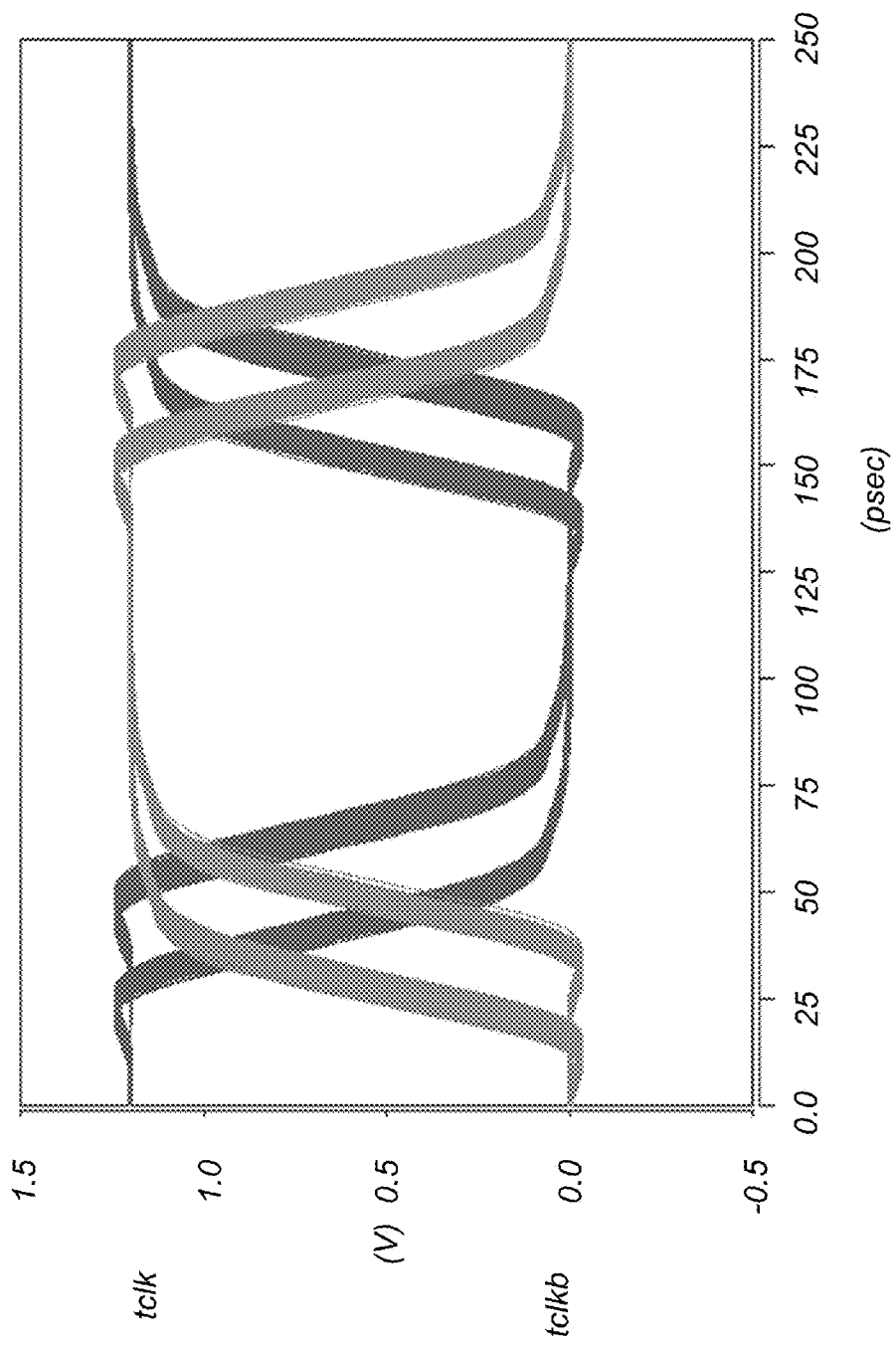
FIGS. 19A to 19D are waveform diagrams illustrating the operation of a receiver according to an embodiment.

FIG. 19A is an eye diagram illustrating a simulation result including the first temporary clock signal tclk and the second temporary clock signal tclkb. Referring to FIG. 19A, it can be seen that jitter occurs in the first temporary clock signal tclk and the second temporary clock signal tclkb.

The first clock delay selector 230 removes the jitter occurring in the first temporary clock signal tclk, and outputs a first select clock signal sclk.

Figure 16:
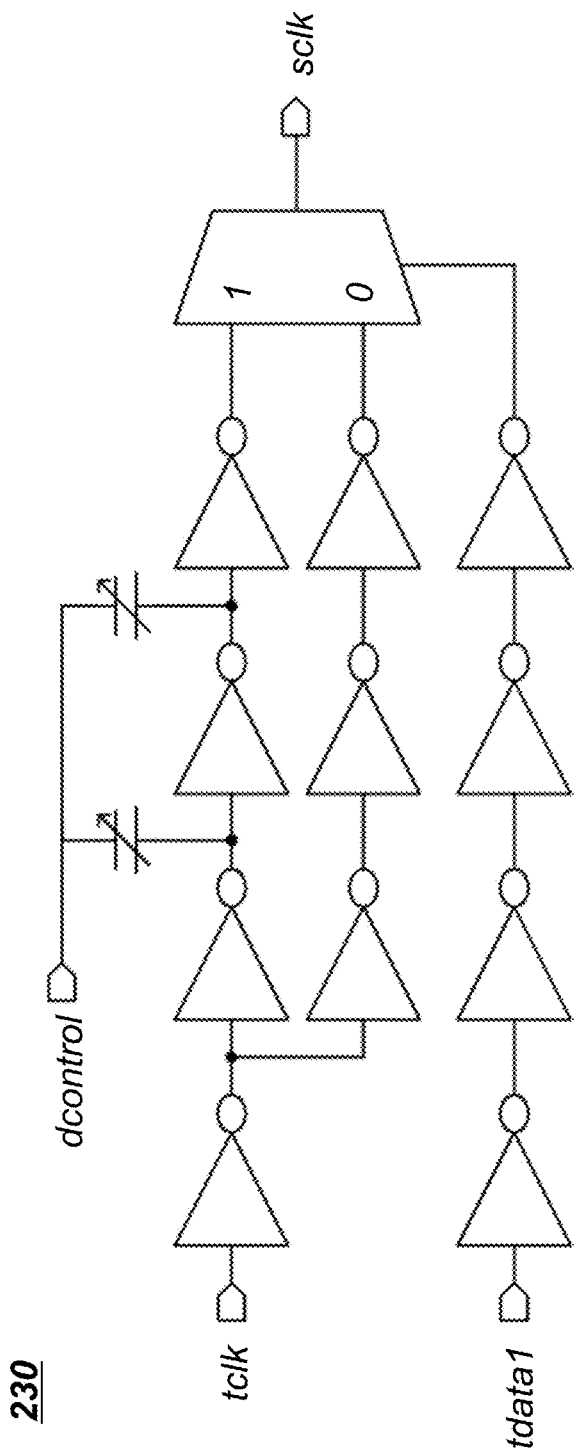
FIG. 16 is a circuit diagram of a first clock delay selector in accordance with an embodiment.

FIG. 16 is a circuit diagram illustrating the first clock delay selector 230 according to an embodiment. The first clock delay selector 230 delays the first temporary clock signal tclk by a first time corresponding to the delay time through the top chain of inverters when the first temporary data signal tdata1 is 1, and delays the first temporary clock signal tclk by a second time corresponding to the delay time through the middle chain of inverters when the first temporary data signal tdata1 is 0. In the present embodiment, the first time is set to be longer than the second time, and the delay time difference between the first time and the second time may be adjusted through a delay control signal dcontrol that alters the capacitance of the illustrated variable capacitors coupled to the top chain of inverters. However, embodiments are not limited thereto.

Figure 19B:
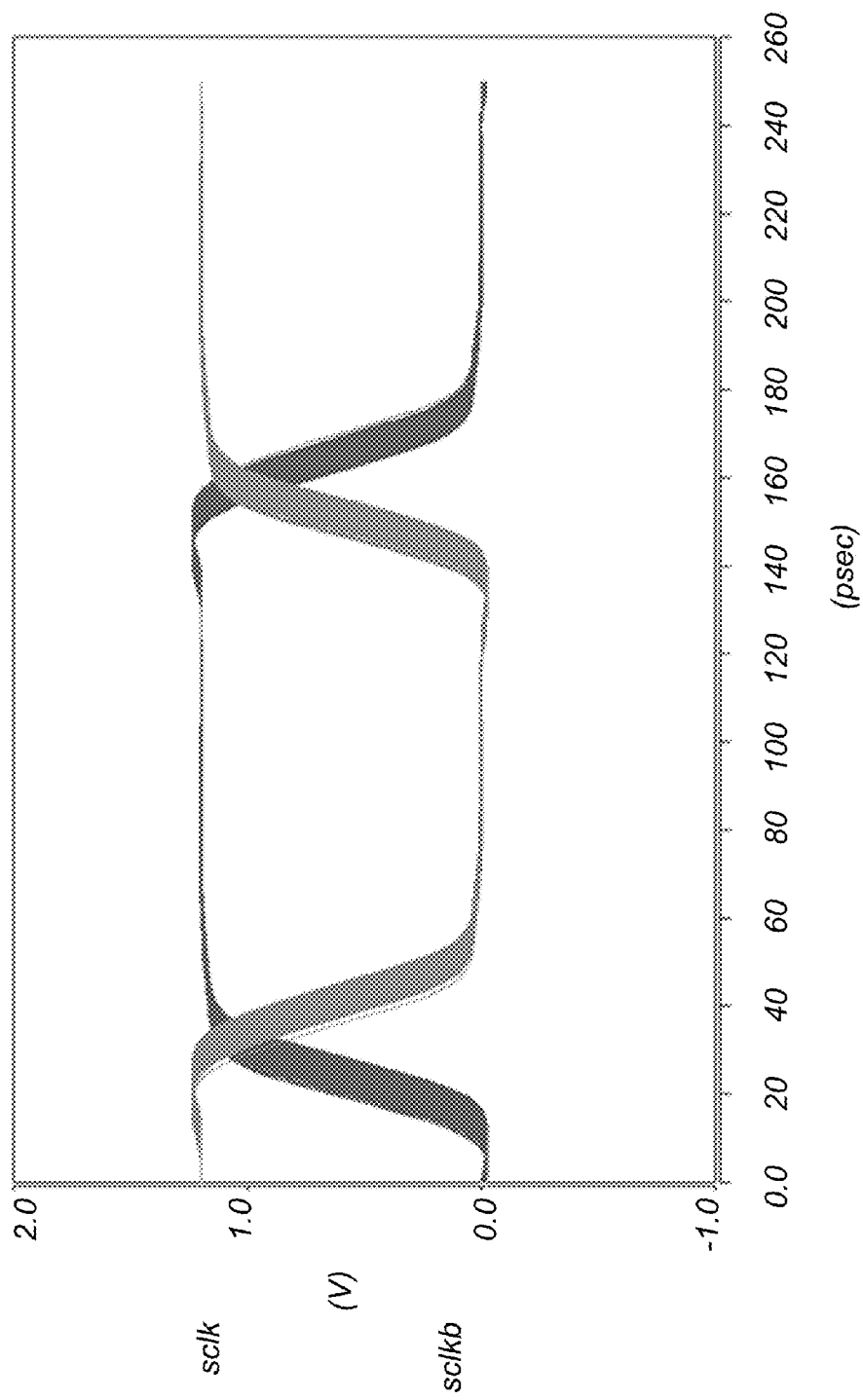

FIG. 19B is an eye diagram illustrating a simulation result including the first select signal sclk outputted from the first clock delay selector 230 and a second select clock signal sclkb outputted from the second clock delay selector 280. Referring to FIG. 19B, it can be seen that jitter caused by data has been removed. That is, the first and second select signals sclk and sclkb does not include jitter.

The second clock extraction circuit 260, the second data extraction circuit 270, and the second clock delay selector 280 operate in a similar manner to the first clock extraction circuit 210, the first data extraction circuit 220, and the first clock delay selector 230, respectively. As a result, the second clock delay selector 280 outputs the second select clock signal sclkb.

As illustrated in FIG. 19B, the first select clock signal sclk and the second select clock signal sclkb do not contain jitter caused by data, but the duty ratio of the two clock signals is not constant.

In the present embodiment, the clock aligner 250 receive the first select clock signal sclk and the second select clock signal sclkb, aligns the two clock signals such that the duty ratio thereof is constant, and outputs the first clock signal clk and the second clock signal clkb having the opposite phase to the first clock signal clk.

Figure 17:
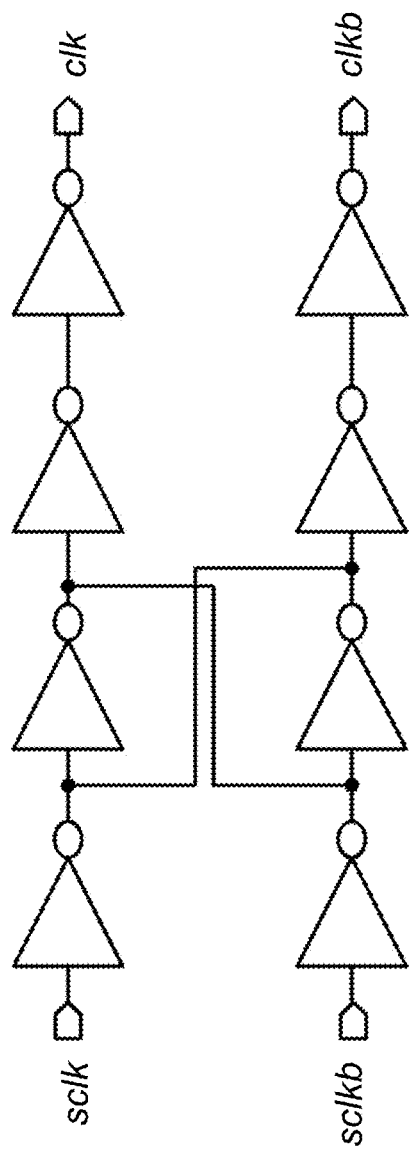
FIG. 17 is a circuit diagram of a clock aligner in accordance with an embodiment.

FIG. 17 is a circuit diagram illustrating the clock aligner 250 according to an embodiment. The clock aligner 250 includes a cross-coupled latch structure. Thus, the edges of the first clock signal clk and the second clock signal clkb are positioned between the edges of the first select clock signal sclk and the second select clock signal sclkb, and the first clock signal clk has the opposite phase to the second clock signal clkb.

Figure 19C:
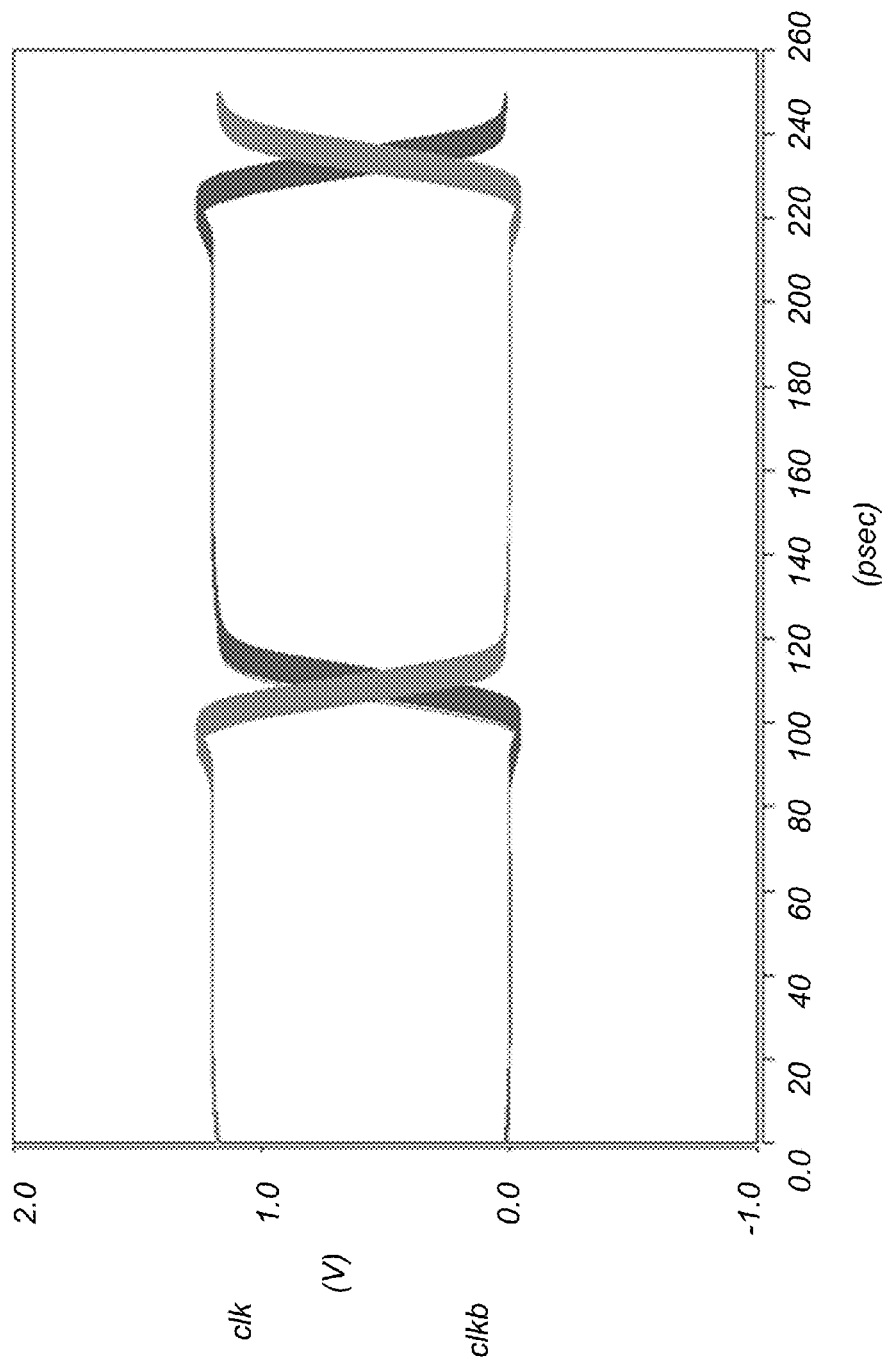

FIG. 19C is an eye diagram illustrating a simulation result including the first and second clock signals clk and clkb outputted from the clock aligner 250, which shows that the duty ratio of the first and second clock signals clk and clkb is constantly maintained, and that the first and second clock signals clk and clkb have the opposite phase to each other. Accordingly, the first clock signal clk and the second clock signal clkb may be reliably recovered through the clock aligner 250.

The first data recovery circuit 240 recovers the first data signal data1 by sampling the first temporary data signal tdata1 according to the first clock signal clk, and the second data recover circuit 290 recovers the second data signal data2 by sampling the second temporary data signal tdata2 according to the second clock signal clkb.

Figure 18:
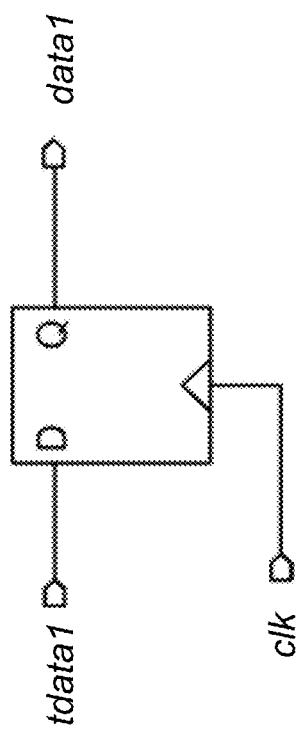
FIG. 18 is a circuit diagram of a first data recovery circuit in accordance with an embodiment.

FIG. 18 is a circuit diagram illustrating the first data recovery circuit 240 according to an embodiment. The first data recovery circuit 240 includes a flip-flop that samples the first temporary data signal tdata1 at rising and falling edges of the first clock signal clk and outputs the first data signal data1. The second data recovery circuit 290 has substantially the same configuration as the first data recovery circuit 240 and outputs the second data signal data2 by sampling the second temporary data signal tdata2 at rising and falling edges of the second clock signal clkb.

Figure 19D:
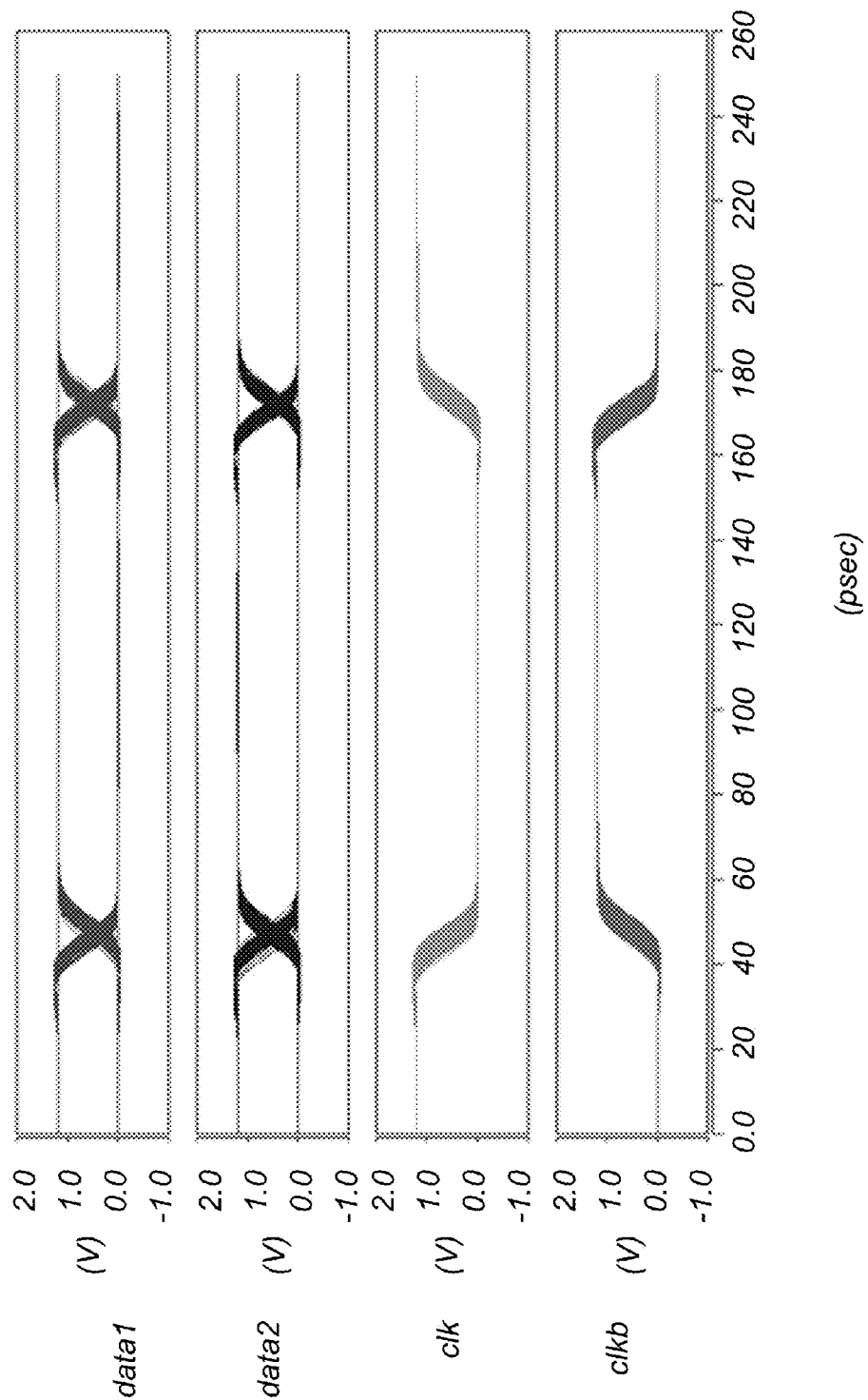

FIG. 19D illustrates a simulation result including the first clock signal clk, the second clock signal clkb, the first data signal data1, and the second data signal data2, which are outputted from the receiver 200. Referring to FIG. 19D, the first data signal data1 and the second data signal data2 are synchronized with the first clock signal clk and the second clock signal clkb, respectively.

In the present embodiment, although the first data signal data1 and the second data signal data2 are synchronized with the first clock signal clk and the second clock signal clkb, the receiver 200 may include an additional circuit (for example, a delay circuit) to set an arbitrary phase difference between the data signal and the clock signal, if necessary.

Figure 20:
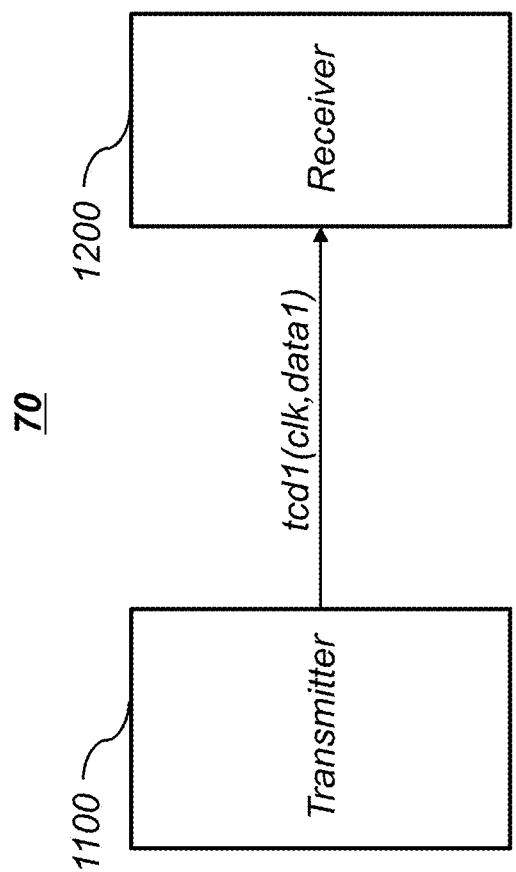
FIG. 20 is a block diagram illustrating a system in accordance with another embodiment.

FIG. 20 is a block diagram illustrating a second system 70 in accordance with another embodiment. The second system 70 differs from the system 50 of FIG. 2 in that the second data signal data2 and the second clock signal clkb having an opposite phase relative to the first clock signal clk are not involved.

The basic configurations and operations of a transmitter 1100 and a receiver 1200 forming the second system 70 are substantially the same as those of the above-described transmitter 100 and receiver 200 of the system 50, except for the absence of the second clock signal clkb and the second data signal data2 in the second system 70.

Figure 21:
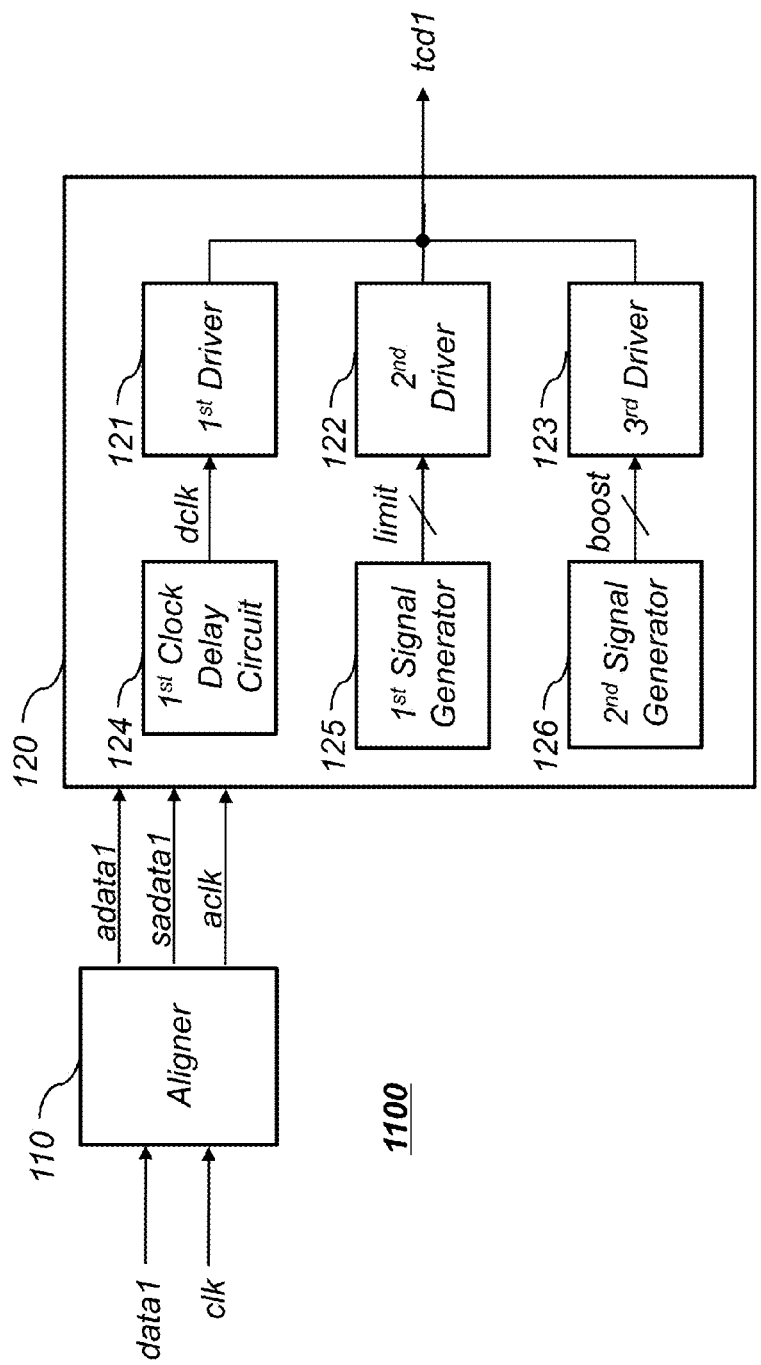
FIG. 21 is a block diagram illustrating a transmitter in accordance with an embodiment.

FIG. 21 is a block diagram illustrating a transmitter 1100 according to an embodiment suitable for use in the second system 70 of FIG. 20. The transmitter 1100 includes an aligner 110 and a first transmission circuit 120. Since the configurations and operations of the aligner 110 and the first transmission circuit 120 are substantially the same as those of the corresponding circuits of the transmitter 100 described above, the detailed descriptions thereof are omitted herein.

Figure 22:
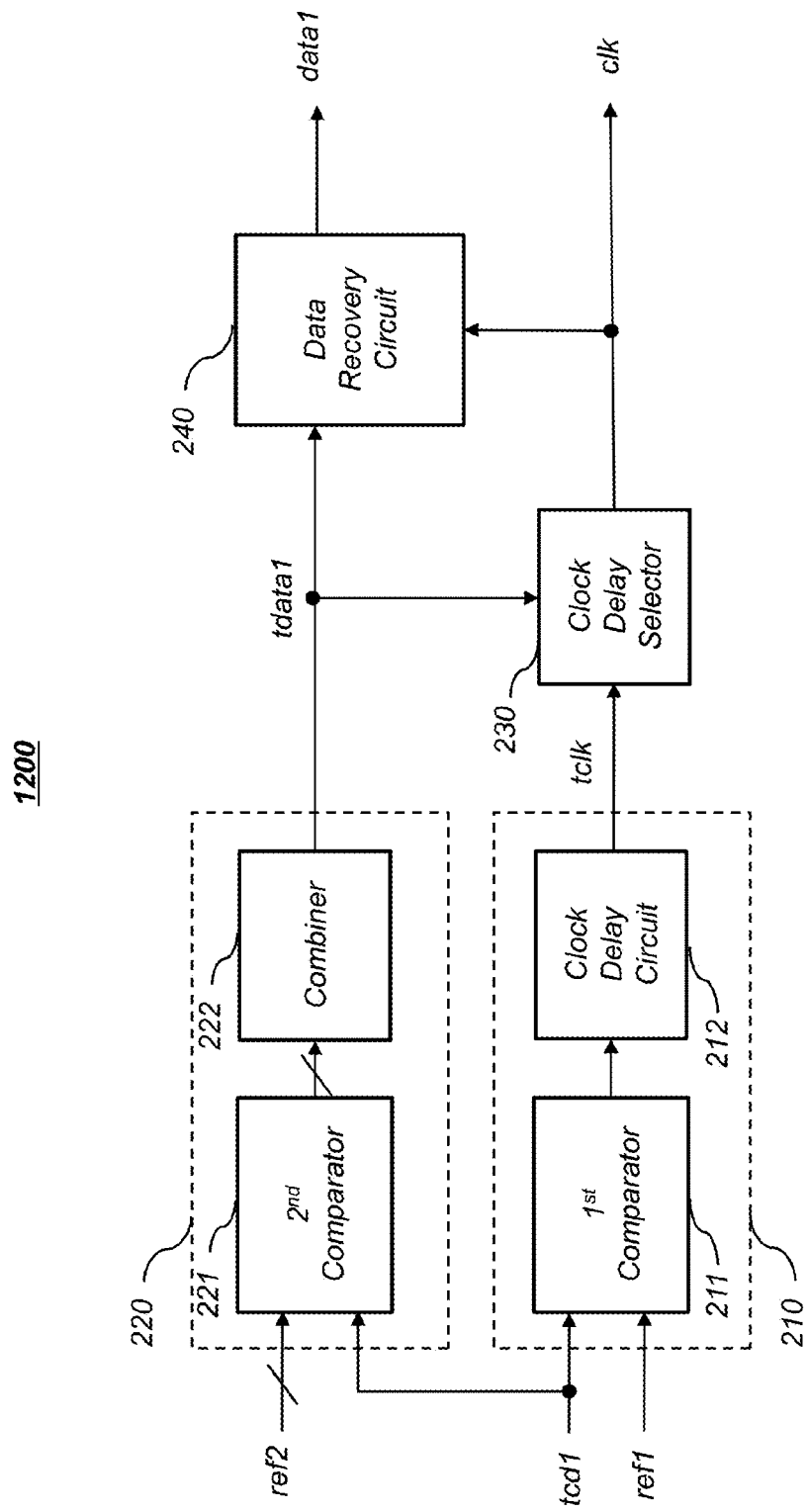
FIG. 22 is a block diagram illustrating a receiver in accordance with an embodiment.

FIG. 22 is a block diagram illustrating a receiver 1200 according to an embodiment suitable for use in the system 70 of FIG. 20. The receiver 1200 includes a clock extraction circuit 210, a data extraction circuit 220, a clock delay selector 230, and a data recovery circuit 240. In the system 70, since the second clock signal clkb is not involved, the receiver 1200 does not include elements related to the second clock signal clkb. Furthermore, the receiver 1200 does not include the clock aligner 250 of FIG. 12. Since the detailed configurations and operations of the respective elements of the receiver 1200 and the previously described receiver 200 are substantially the same, the detailed descriptions thereof are omitted herein.

In accordance with the embodiments of the present disclosure, because a clock signal and a data signal are transmitted through a same transmission line, a number of transmission lines may be reduced. Furthermore, as clock signals and data signals are transmitted and received through simpler circuits than the conventional transmitter and receiver, the area and power consumption of the system may be reduced.

Although various embodiments have been described for illustrative purposes, it will be apparent to those skilled in the art that various changes and modifications may be made without departing from the spirit and scope of the present disclosure as defined in the following claims.

What is claimed is:

1. A transmitter comprising:
an aligner configured to align a phase of an input clock signal and a phase of a data signal and output an aligned clock signal and an aligned data signal; and
a transmission circuit configured to generate a transmission signal,
wherein a phase of the transmission signal is controlled according to the aligned clock signal and an amplitude of the transmission signal is controlled according to the aligned data signal, and
wherein the transmission circuit comprises:
a first driver configured to generate the transmission signal using the aligned clock signal; and
a second driver configured to control the amplitude of the transmission signal according to the aligned data signal.

2. The transmitter of claim 1, wherein:
when the aligned data signal has a first value, the second driver controls the transmission signal such that the amplitude of the transmission signal becomes a first level, and
when the aligned data signal has a second value, the second driver controls the transmission signal such that the amplitude of the transmission signal becomes a second level larger than the first level.

3. The transmitter of claim 2, wherein the transmission circuit further comprises
a third driver configured to control a swing timing of the transmission signal according to the aligned data signal.

4. The transmitter of claim 2, wherein when the aligned data signal has the second value, the third driver advances the swing timing of a next change of the phase of the transmission signal.

5. The transmitter of claim 3, wherein the transmission circuit further comprises:
a first signal generator configured to control the second driver according to the aligned clock signal and the aligned data signal; and
a second signal generator configured to control the third driver according to the aligned clock signal and the aligned data signal.

6. The transmitter of claim 5, wherein the transmission circuit further comprises a clock delay circuit configured to delay the aligned clock signal according to a time delay of the first or second signal generators, and
wherein the first driver generates the transmission signal using the output of the clock delay circuit.

7. The transmitter of claim 1, wherein the transmission circuit is a first transmission circuit, the transmission signal is a first transmission signal, the input clock signal and the data signal are a first clock signal and a first data signal, respectively, the aligned clock signal is an aligned first clock signal, and the aligned data signal is an aligned first data signal,
wherein the transmitter further comprises:
a second transmission circuit configured to generate a second transmission signal having a phase and an amplitude that are controlled according to an aligned second clock signal and an aligned second data signal, respectively, and
wherein the aligner is configured to further align a phase of a second clock signal and a phase of a second data signal and output the aligned second clock signal and the aligned second data signal.

8. The transmitter of claim 7, wherein the second transmission circuit comprises:
a fourth driver configured to generate the second transmission signal using the aligned second clock signal;
a fifth driver configured to control the amplitude of the second transmission signal according to the aligned second data signal; and
a sixth driver configured to control a swing timing of the second transmission signal according to the aligned second data signal.

9. The transmitter of claim 8, wherein the fifth driver controls the second transmission signal such that the amplitude of the second transmission signal becomes a first level when the aligned second data signal has a first value, and becomes a second level when the aligned second data signal has a second value.

10. The transmitter of claim 9, wherein when the aligned second data signal has the second value, the sixth driver advances the swing timing of a next change of the phase of the second transmission signal.

11. The transmitter of claim 10, wherein the second transmission circuit further comprises:
a third signal generator configured to control the fifth driver according to the aligned second clock signal and the aligned second data signal; and
a fourth signal generator configured to control the sixth driver according to the aligned second clock signal and the aligned second data signal.

12. The transmitter of claim 11, wherein the second transmission circuit further comprises a clock delay circuit configured to delay the aligned second clock signal according to a time delay of the third or fourth signal generators, and
wherein the fourth driver generates the second transmission signal using the output of the clock delay circuit.

13. A receiver that receives transmission signals each having an amplitude and a phase that are controlled according to a data signal and a clock signal, the receiver comprising:
a clock extraction circuit configured to extract a temporary clock signal from a transmission signal;
a data extraction circuit configured to extract a temporary data signal from the transmission signal;
a clock delay selector configured to delay the temporary clock signal according to a value of the temporary data signal, and output a delayed temporary clock signal; and
a data recovery circuit configured to sample the temporary data signal using the delayed temporary clock signal, and output the data signal,
wherein the clock extraction circuit comprises a first comparator configured to compare the transmission signal to a first reference voltage.

14. The receiver of claim 13, wherein the clock extraction circuit further comprises a clock delay circuit configured to generate the temporary clock signal by delaying the signal outputted from the first comparator.

15. The receiver of claim 13, wherein the data extraction circuit comprises:
a second comparator configured to compare the transmission signal to a plurality of second reference voltages; and
a combiner configured to combine comparison results outputted from the second comparator and generate the temporary data signal.

16. The receiver of claim 13, wherein when the temporary data signal has a first value, the clock delay selector delays the temporary clock signal by a first time and outputs the delayed signal as the clock signal, and when the temporary data signal has a second value, the clock delay selector delays the temporary clock signal by a second time and outputs the delayed signal as the clock signal.

17. The receiver of claim 13, wherein the transmission signal is a first transmission signal, the data signal and the clock signal are a first data signal and a first clock signal, respectively, the temporary data signal and the temporary clock signal are a first temporary data signal and a first temporary clock signal, respectively, the delayed temporary clock signal is a delayed first temporary clock signal, and the circuits are a first clock extraction circuit, a first data extraction circuit, a first clock delay selector, and a first data recovery circuit, respectively, and
wherein the receiver further comprises:
a second clock extraction circuit configured to extract a second temporary clock signal from a second transmission signal;
a second data extraction circuit configured to extract a second temporary data signal from the second transmission signal;
a second clock delay selector configured to control a delay of the second temporary clock signal according to the second temporary data signal;
a clock aligner configured to align edges of the delayed first and second temporary clock signals outputted from the first and second clock delay selectors and output the first clock signal and a second clock signal; and
a second data recovery circuit configured to sample the second temporary data signal according to the second clock signal and recover a second data signal, and
wherein the first data recovery circuit samples the first temporary data signal according to the first clock signal outputted from the clock aligner to recover the first data signal.

18. The receiver of claim 17, wherein the second clock extraction circuit comprises a third comparator configured to compare the second transmission signal to the first reference voltage.

19. The receiver of claim 18, wherein the second clock extraction circuit further comprises a second clock delay circuit configured to generate the second temporary clock signal by delaying the signal outputted from the third comparator.

20. The receiver of claim 17, wherein the second data extraction circuit comprises:
a fourth comparator configured to compare the second transmission signal to a plurality of second reference voltages; and
a second combiner configured to combine comparison results outputted from the fourth comparator and generate the second temporary data signal.

21. The receiver of claim 17, wherein the second clock delay selector delays the second temporary clock signal by a third time when the second temporary data signal has a first value, and delays the second temporary clock signal by a fourth time when the second temporary data signal has a second value.

22. The receiver of claim 21, wherein the clock aligner aligns edges of the first and second clock signals such that the edges of the first and second clock signals are positioned between an edge of the signal outputted from the first clock delay selector and an edge of the signal outputted from the second clock delay selector.

23. A system comprising:
a transmitter comprising:
an aligner configured to align phases of a clock signal and a data signal; and
a transmission circuit configured to generate a transmission signal having a phase and an amplitude that are controlled according to the aligned clock signal and the aligned data signal, respectively; and
a receiver comprising:
a clock extraction circuit configured to extract a temporary clock signal from the transmission signal;
a data extraction circuit configured to extract a temporary data signal from the transmission signal;
a clock delay selector configured to delay the temporary clock signal according to a value of the temporary data signal and output a delayed temporary clock signal; and
a data recovery circuit configured to sample the temporary data signal using the delayed temporary clock signal and recover the data signal.

24. The system of claim 23, wherein the clock signal is a first clock signal, the data signal is a first data signal, the transmission signal is a first transmission signal, the temporary data signal is a first temporary data signal, the temporary clock signal is a first temporary clock signal, the delayed temporary clock signal is a delayed first temporary clock signal, the transmission circuit is a first transmission circuit, the clock extraction circuit is a first clock extraction circuit, the data extraction circuit is a first data extraction circuit, the clock delay selector is a first clock delay selector, and the data recovery circuit is a first data recovery circuit, and wherein
the transmitter further comprises:
the aligner configured to align phases of the first clock signal, a second clock signal having an opposite phase to the first clock signal, the first data signal, and a second data signal; and
a second transmission circuit configured to generate a second transmission signal having a phase and an amplitude that are controlled according to an aligned second clock signal and an aligned second data signal, respectively; and
wherein the receiver further comprises:
a second clock extraction circuit configured to extract a second temporary clock signal from the second transmission signal;
a second data extraction circuit configured to extract a second temporary data signal from the second transmission signal;
a second clock delay selector configured to control a delay of the second temporary clock signal according to the second temporary data signal;
a clock aligner configured to align edges of the delayed first and second temporary clock signals outputted from the first and second clock delay selectors and output the first clock signal and the second clock signal; and
a second data recovery circuit configured to sample the second temporary data signal according to the second clock signal and recover the second data signal, and
wherein the first data recovery circuit samples the first temporary data signal according to the first clock signal outputted from the clock aligner to recover the first data signal.

25. The transmitter of claim 1, wherein the aligned clock signal is a delayed version of the input clock signal.

* * * * *